(12) United States Patent
Watanabe et al.

(10) Patent No.: US 8,265,840 B2
(45) Date of Patent: Sep. 11, 2012

(54) CONTROL DEVICE FOR AUTOMATIC TRANSMISSION

(75) Inventors: Masato Watanabe, Nagoya (JP); Masato Kaigawa, Toyota (JP); Ichiro Kitaori, Nagoya (JP); Masakazu Owatari, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 508 days.

(21) Appl. No.: 12/444,416

(22) PCT Filed: Oct. 4, 2007

(86) PCT No.: PCT/JP2007/069505
§ 371 (c)(1),
(2), (4) Date: Jun. 3, 2009

(87) PCT Pub. No.: WO2008/044609
PCT Pub. Date: Apr. 17, 2008

(65) Prior Publication Data
US 2009/0271081 A1    Oct. 29, 2009

(30) Foreign Application Priority Data

Oct. 5, 2006   (JP) ................................. 2006-274406
Jan. 13, 2007  (JP) ................................. 2007-005257

(51) Int. Cl.
*G06F 7/00* (2006.01)
(52) U.S. Cl. ................. 701/61; 701/64; 701/65; 701/66; 477/46; 477/120; 477/109

(58) Field of Classification Search ............... 701/60, 701/54–55, 61, 64–66, 87; 477/46, 62, 80, 477/94, 108–109, 121–122, 154–155, 901, 477/908
See application file for complete search history.

(56) References Cited

U.S. PATENT DOCUMENTS 7,107,135 B2 *   9/2006   Soliman et al. ................. 701/55
2004/0153232 A1 *   8/2004   Wada et al. ..................... 701/55

FOREIGN PATENT DOCUMENTS

| JP | 03-41259 A | 2/1991 |
| JP | 3260455 | 11/1991 |
| JP | 7109247 | 4/1995 |
| JP | 2003028284 | 1/2003 |
| JP | 2004218799 | 8/2004 |
| JP | 2004316845 | 11/2004 |
| JP | 2005257063 | 9/2005 |

* cited by examiner

*Primary Examiner* — Thomas Black
*Assistant Examiner* — Luke Huynh
(74) *Attorney, Agent, or Firm* — Gifford, Krass, Sprinkle, Anderson & Citkowski, P.C.

(57) ABSTRACT

A control device for an automatic transmission is disclosed wherein a shift point depending on a variation in vehicle acceleration is modified on a real time basis in accordance with not only a corrected result on a shift point depending on piece-to-piece variations of automatic transmissions, but also actual acceleration for shortening a time required for learning with high precision with no need to be matched. Shift point real-time modifying means is provided for modifying the altered shift point based on a value of a ratio between a value of actual engine-rotation acceleration at an upshift-determining timing during a power-on running and a value of reference engine-rotation acceleration obtained by substituting a value of actual engine-rotation acceleration to a value for a reference running state having no impact on acceleration of a vehicle, and a target maximum engine rotation speed.

16 Claims, 18 Drawing Sheets

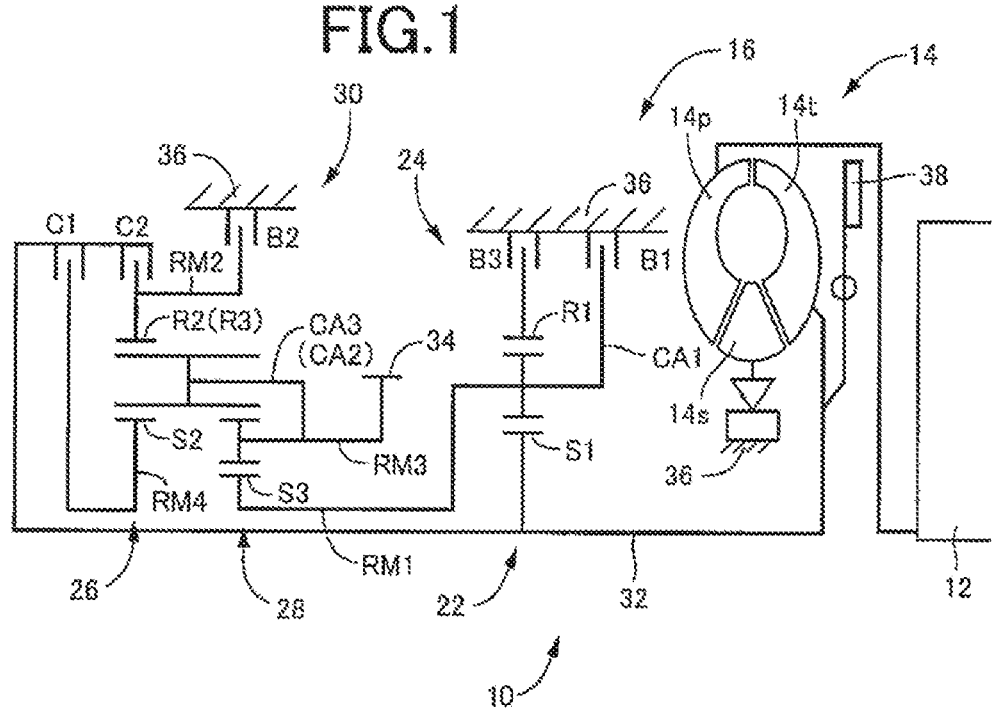

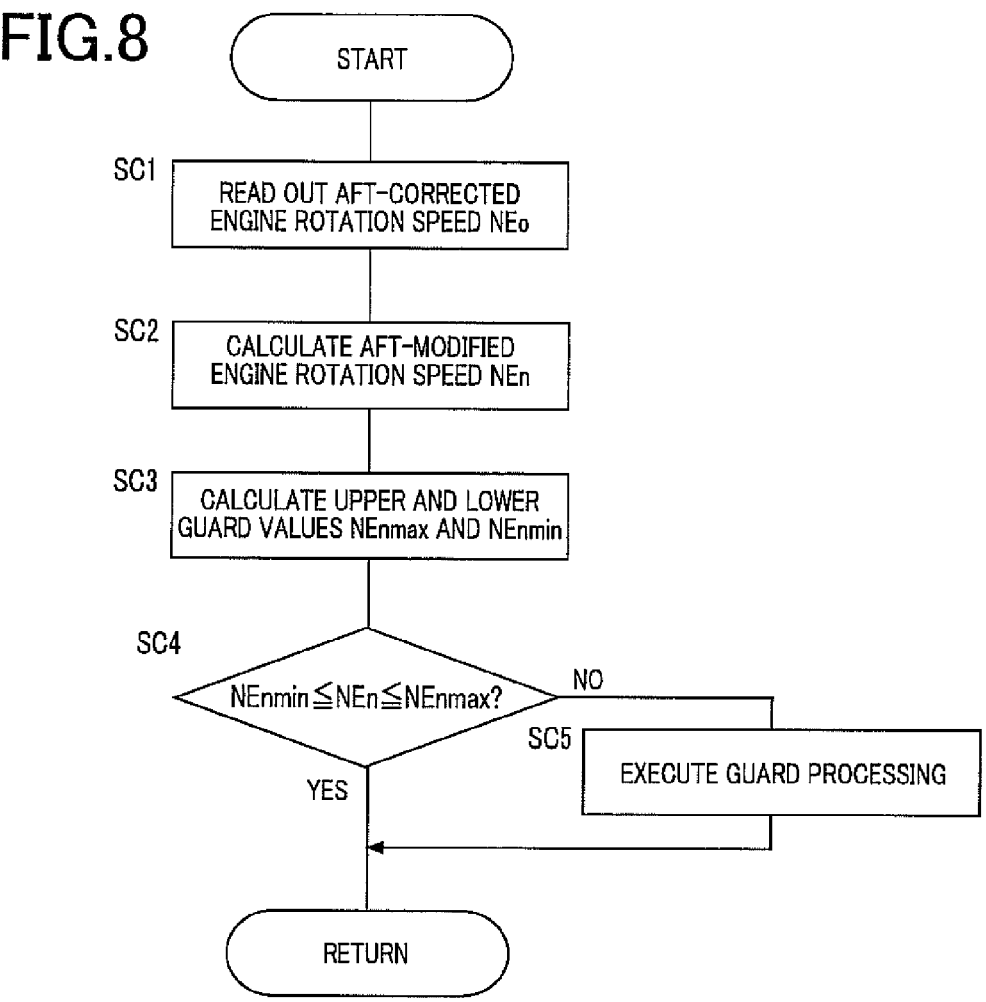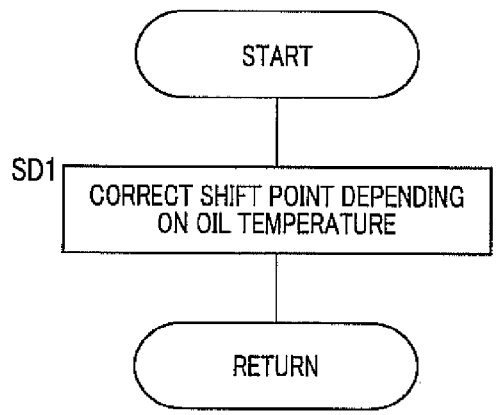

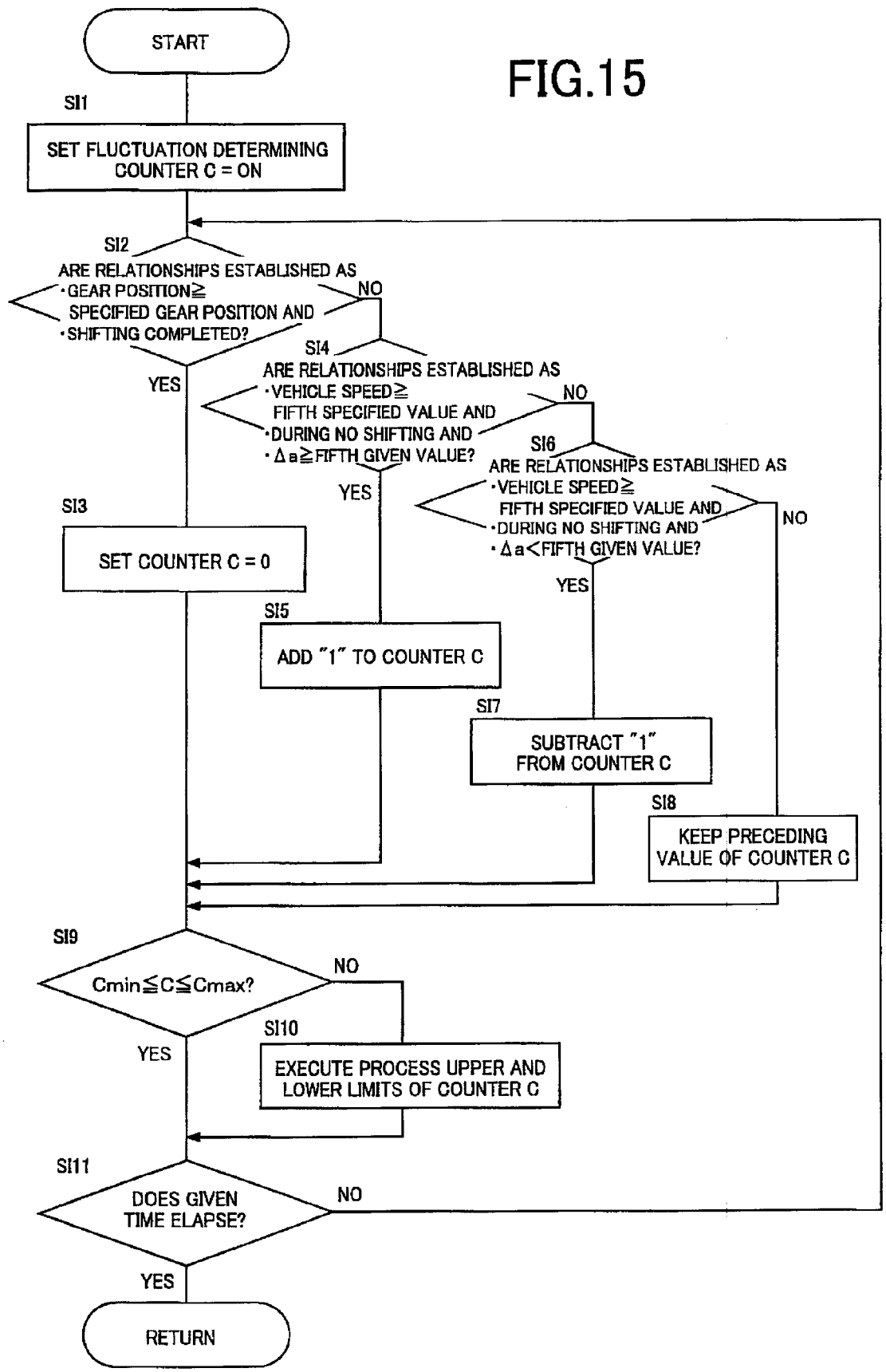

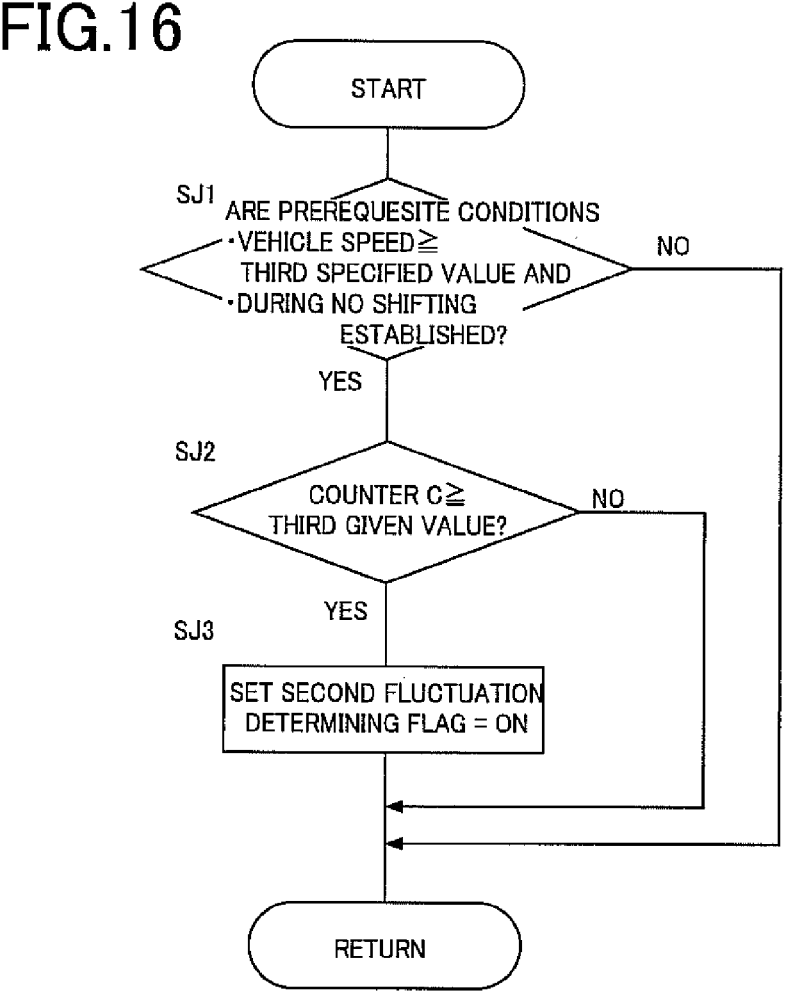

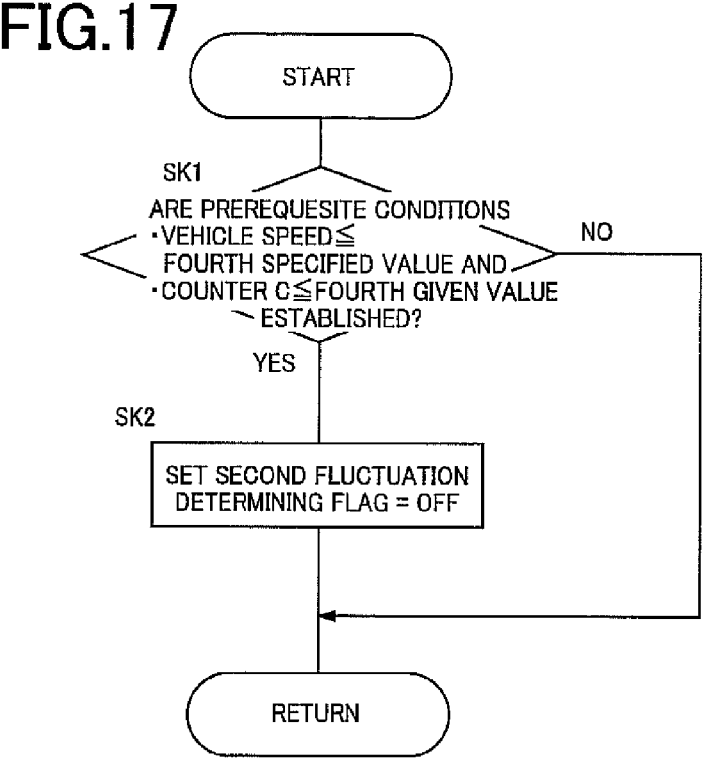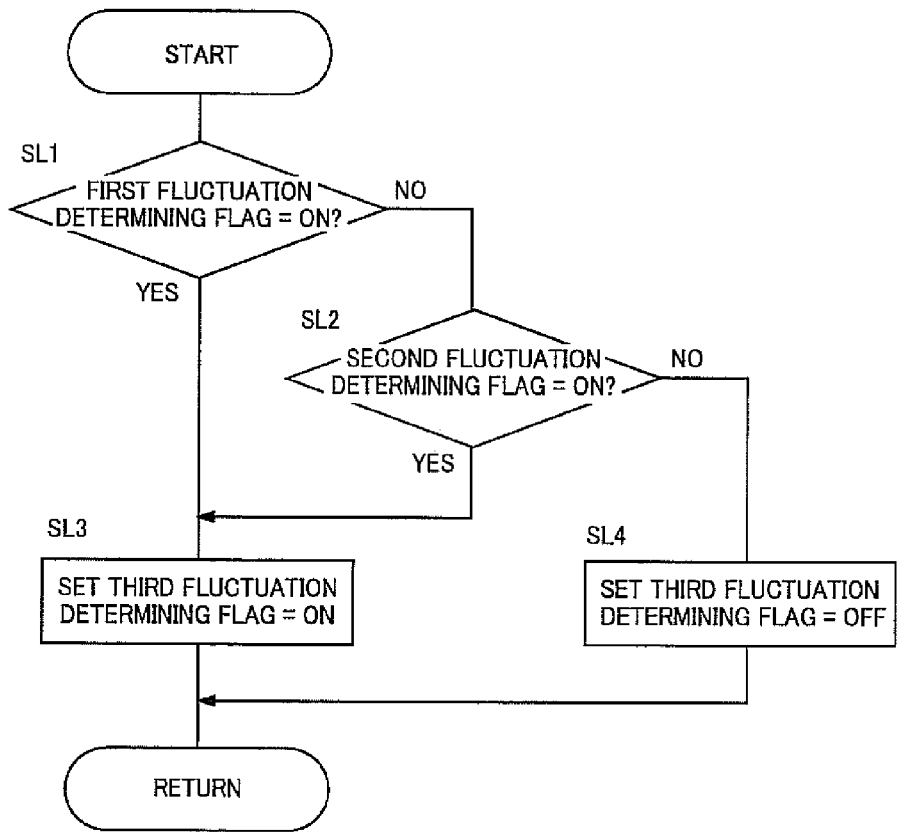

FIG.23

| | C1 | C2 | B1 | B2 | B3 | SHIFT RATIO | STEP |
|---|---|---|---|---|---|---|---|
| 1st | ○ | | | ◎ | | 3.300 | |
| 2nd | ○ | | ○ | | | 1.900 | 1.737 |
| 3rd | ○ | | | | ○ | 1.421 | 1.338 |
| 4th | ○ | ○ | | | | 1.000 | 1.421 |
| 5th | | ○ | | | ○ | 0.713 | 1.402 |
| 6th | | ○ | ○ | | | 0.609 | 1.172 |
| Rev | | | | ○ | ○ | 4.148 | TOTAL 5.421 |

CONTROL DEVICE FOR AUTOMATIC TRANSMISSION

TECHNICAL FIELD

The present invention relates to a shift control device for a vehicular automatic transmission. More particularly, it relates to a technology of controlling a shifting output timing to allow an engine rotation speed at an inertia-phase start timing during an upshifting under a high load state such as a toeing and a hill-climb running or the like to approach a predetermined target maximum rotation speed at a high speed as fast as possible but not to exceed such a speed.

BACKGROUND ART

With vehicles in which a power-on upshifting is executed in an automatic transmission in accordance with a shift command, shift control devices for vehicular automatic transmissions have heretofore been known. The shift control devices control a timing at which a shifting output is initiated such that an engine rotation speed at inertia-phase start timing during, for instance, a full-throttle upshifting falls in a predetermined range. One example of such devices is disclosed in, for instance, Patent Publication 1, which discloses a structure in which the relationship between either one of a throttle opening, transmission input torque and a vehicle speed and an inertia-phase commencing time is preliminarily stored. A prime-mover rotation speed at the inertia-phase commencing timing is estimated based on the stored relationship and prime-mover acceleration upon which a shift point is corrected such that the estimated prime-mover rotation speed falls in a given range.

With such a device, in usual practice, given shift lines (in a shifting pattern) are used to obtain the maximum output during the upshifting mode with an accelerator-opening or a throttle opening being filly opened (at a value of 100%). The shifting pattern is determined such that an engine rotation speed lies at a high rotation speed within a range to cause the engine rotation speed not to fall in a predetermined red zone and a fuel cutoff range determined at a level above the red zone. At the same time, the shifting lines are altered depending on a load capacity of the vehicle such that the shifting output is initiated at an optimum timing.

Meanwhile, there is a vehicle that is arranged to execute the power-on upshifting of the automatic transmission in accordance with the shift point. With such a vehicle, in order for the engine rotation speed at the inertia-phase commencing timing during, for instance, the full-throttle upshifting mode to approach a predetermined target engine rotation speed without exceeding beyond the predetermined target engine rotation speed, the following are required. That is, a need arises not only for correcting the shift point depending on piece-to-piece variations of automatic transmissions as disclosed in Patent Publication 1 but also for correcting the shift point depending on a variation in vehicle acceleration.

Such devices are disclosed in, for instance Patent Publications 2 and 3. Patent Publication 2 discloses a technology in which the learning of the shifting is conducted for each predetermined segment of vehicle acceleration to allow a learned result for the corresponding segment of vehicle acceleration to be selected during the shifting for correcting the shift point. Further, Patent Publication 3 discloses a technology in which the learning for the shift point is conducted in a learning amount per unit acceleration to allow the learning amount per unit acceleration to be converted depending on vehicle acceleration by referring to a given formula to allow the shift point to be corrected based on such a result.

[Patent Publication 1] Japanese Patent Application Publication No. 2004-316845
[Patent Publication 2] Japanese Patent Application Publication No. 2003-28284
[Patent Publication 3] Japanese Patent Publication No. 7-109247

DISCLOSURE OF THE INVENTION

Subject Matter to be Solved

However, with Patent Publication 1, in calculating the inertia-phase commencing time, the inertia-phase commencing time is acquired from the relationship stored on a map. Therefore, depending on a running state of the vehicle, it is likely that an error occurs between an estimated prime-mover rotation speed and an actual prime-mover rotation speed during the inertia-phase commencing mode.

Further, with Patent Publication 2, the learning of the shift point depending on the piece-to-piece variations of the automatic transmissions with no regard to acceleration is conducted in nature for each segment. Therefore, it takes a long time required for the learning on a whole of the segments of acceleration to be completed. In addition, for the purpose of shortening the time required for such learning to be completed, deterioration occurs in learning because the segmented accelerations to be corrected at equal rates, respectively.

Furthermore, with the technology disclosed in Patent Publication 3, the learning amount per unit acceleration include that is obtained by dividing a deviation between the target maximum engine rotation speed and an actual engine rotation speed by acceleration at the shifting output. However, such a method cannot be said that the deviation per unit acceleration is not theoretically calculated, and accordingly a precision in learning is not correct. Further, although an attempt is made to use a delay time for correcting the deterioration in such precision, a need arises for the delay time to be set such that it complies with such deterioration in an undesired step in advance.

The present invention has been completed with the above issues in mind and has an object to allow a shift point to be corrected depending on not only a result on correcting the shift point depending on piece-to-piece variations in automatic transmissions learned based on a reference engine-rotation acceleration related value, but also the shift point depending on a variation in vehicle acceleration is modified depending on actual acceleration. This allows the provision of a control device for an automatic transmission that has a short time required for the learning with high precision while no need to be matched.

Means for Solving the Subject Matter

For achieving the above object, a first aspect of the invention relates to a control device for a vehicular automatic transmission of the type operative to initiate an upshifting output to allow a vehicle speed to pass across a predetermined shift point during a power-on running, and to correct the shift point such that a maximum value of an engine rotation speed, increasing for a given time interval even after the upshifting output, approaches a target maximum engine rotation speed.

The control device comprises shift point real-time modifying means operating such that, upon a high engine-rotation acceleration related value, the shift point is modified to allow a shifting to be initiated at a lower vehicle speed than that upon a low engine-rotation acceleration related value, and such that, upon a high fluctuation in the engine-rotation acceleration related value, a correction of the shift point is lower than that of the shift point upon a low fluctuation in the engine-rotation acceleration related value.

Effect of the Invention

With such a structure, when the engine-rotation acceleration related value is high, the shift point real-time modifying means corrects the shift point to allow the shifting to be initiated at a lower vehicle speed than that at which the shifting is initiated when the engine-rotation acceleration related value is low. Also, when a fluctuation in the engine-rotation acceleration related value is great, the shifting is corrected at a low rate than that at which the shifting is initiated when the fluctuation in the engine-rotation acceleration related value is low. This allows the provision of a control device for an automatic transmission that has a short time required for the learning with high precision with no need to be matched.

Preferably, upon the high fluctuation in vehicle acceleration, the control device determines that the fluctuation in the engine-rotation acceleration related value is high. With such a structure, a determination can be easily made based on a varying rate of the vehicle speed that the fluctuation in the engine-rotation acceleration related value is great.

Preferably, when the fluctuation in the engine-rotation acceleration related value is greater than a given reference value, the control device interrupts the correction of the shift point. This inhibits the correction of the shift point in which the fluctuation in the engine-rotation acceleration related value is great.

For achieving the above object, a fourth aspect of the invention relates to a control device for a vehicular automatic transmission of the type operative to initiate an upshifting output to allow a vehicle speed to pass across a predetermined shift point during a power-on running, and to correct the shift point such that a maximum value of an engine rotation speed, increasing for a given time interval even after the upshifting output, approaches a target maximum engine rotation speed.

The control device comprises shift point real-time modifying means i.e., a modifying portion for modifying the shift point, subjected to the correction, on a real time basis based on a value of a ratio between an actual engine-rotation acceleration related value at an upshift-determining timing during the power-on running and a reference engine-rotation acceleration related value substituting a value of the actual engine-rotation acceleration related value to a value for a reference running state having no impact on an acceleration of a vehicle, and the target maximum engine rotation speed.

With such a structure, the shift point real-time modifying means allows the shift point, corrected so as to allow the maximum value of the engine rotation speed increasing for the given time interval even after the shifting output to approach the target maximum engine rotation speed, to be modified as described in the following. That is, the shift point is modified on a real time basis based on a value of the ratio between the actual engine-rotation acceleration related value at the upshift-determining timing during the power-on running and the reference engine-rotation acceleration related value, obtained by substituting the value of the actual engine-rotation acceleration related value to the value for the reference running state having no impact on the acceleration of the vehicle, and the target maximum engine rotation speed.

Accordingly, a shift command can be initiated at timing upon taking the actual engine-rotation acceleration related value into consideration. As a result, if the engine-rotation acceleration related value is different from the reference engine-rotation acceleration related value, i.e., during a running condition such as toeing hill-climb running giving an impact on acceleration of the vehicle, the engine rotation speed can be caused to approach the target engine rotation speed.

Preferably, the reference running state includes a flat-road running state with a predetermined reference number-of-occupant state of a vehicle. With such a structure, the shift point real-time modifying means calculates the reference engine-rotation acceleration related value that is obtained by substituting the engine-rotation acceleration related value at the upshift-determining timing during the power-on running mode to a value for the reference running state having no impact on acceleration of the vehicle.

Thereafter, the corrected value is further modified based on the value of the ratio between the reference engine-rotation acceleration related value and the engine-rotation acceleration related value at the upshift-determining timing. Accordingly, even if acceleration of the vehicle is different from a normal state like phases during the toeing and the hill-climb running, the shift point can be modified depending on the magnitude of acceleration.

Preferably, the power-on running includes a maximum-acceleration running with an accelerator pedal being operated in a maximal demanded state for an engine. With such a structure, during the shifting with WOT (Wide Open Throttle: Full Throttle) under which, particularly, the maximum engine rotation speed during the shifting needs to follow the target maximum engine rotation speed, it becomes possible to allow the maximum engine rotation speed to follow the target maximum engine rotation speed with increased precision.

Accordingly, it becomes possible to suppress the occurrences of a phenomenon in which the upshifting is executed without causing the engine rotation speed to reach the target maximum engine rotation speed and a phenomenon in which the upshifting is executed with the engine rotation speed continuously exceeding an allowable maximum engine rotation speed. As a result, a user's uncomfortable feeling caused by the decrease described above can be minimized.

Preferably, the control device further includes shift-point correcting means i.e., a correcting portion for estimating an estimated maximum engine rotation speed substituting a maximum value of an engine rotation speed subsequent to the upshifting output during the power-on running to the value for the reference running state, and for correcting the shift point based on a corrected value calculated based on a deviation between the estimated maximum engine rotation speed and the target maximum engine rotation speed, and the shift point real-time modifying means corrects the corrected value on a real time basis.

With such a structure, the operation is executed to estimate the estimated maximum engine rotation speed obtained by substituting the maximum value of the engine rotation speed subsequent to the upshifting output during the power-on running mode to the value for the reference running state having no impact on acceleration of the vehicle. Thereafter, the corrected value is modified on a real time basis for the shift point corrected based on the corrected value calculated based on the deviation between the estimated maximum engine rotation speed and the target maximum engine rotation speed. This makes it possible not only to allow the correction of the shift point depending on the piece-to-piece variations of automatic transmissions but also to allow the shift point to be modified depending on a variation in acceleration of the vehicle.

Preferably, the control device further including vehicle-acceleration fluctuation detecting means i.e., a detecting portion for detecting a magnitude of a fluctuation in acceleration of the vehicle, and the shift-point correcting means adjusts the corrected value based on the magnitude of the fluctuation in acceleration of the vehicle detected with the vehicle-acceleration fluctuation detecting means.

With such a structure, the corrected value can be adjusted based on the magnitude of the fluctuation in acceleration of the vehicle detected with the vehicle-acceleration fluctuation detecting means. Accordingly, even if the fluctuation in acceleration of the vehicle occurs, an influence of erroneous learning can be minimized and continued without interrupting the operation of the shift-point correcting means to learn the shift point or to correcting the shift point.

Preferably, the shift-point correcting means adjusts the corrected value such that the greater the magnitude of the fluctuation in acceleration of the vehicle detected with the vehicle-acceleration fluctuation detecting means, the smaller will be the corrected value in comparison to that upon no fluctuation in acceleration of the vehicle. With such a structure, the shift-point correcting means adjusts the corrected value such that the greater the magnitude of the fluctuation in acceleration of the vehicle detected with the vehicle-acceleration fluctuation detecting means, the smaller will be the corrected value in comparison to that when no fluctuation occurs in acceleration of the vehicle. Accordingly, even if the shift point is continuously learnt or corrected under a circumstance where like a phase when running on a punishing road, the fluctuation occurs in acceleration of the vehicle, the adjustment is made so as to specify the corrected value, thereby enabling the suppression of an adverse affect arising from a resultant erroneous learning, i.e., the occurrence of correcting the shift point so as to allow the shifting to be executed at erroneous timing.

Preferably, the shift point real-time modifying means includes aft-modified engine rotation speed calculating means that calculates an aft-modified engine rotation speed representing an engine rotation speed at a shift point subsequent to the correction based on (i) an acceleration correcting coefficient representing a ratio between the actual engine-rotation acceleration related value at the upshift-determining timing and the reference engine-rotation acceleration related value, and (ii) a deviation between the target maximum engine rotation speed and the aft-corrected engine rotation speed representing an engine rotation speed at the shift point corrected based on the corrected value, or a fore-correction engine rotation speed representing an engine rotation speed at the shift point prior to the correction thereof, by referring to a preliminarily stored relationship.

With such a structure, the aft-modified engine rotation speed can be calculated based on the deviation among the value of the acceleration correcting coefficient, the target maximum engine rotation speed, the aft-corrected engine rotation speed or the fore-correction engine rotation speed.

Preferably, the relationship preliminarily stored in the aft-modified engine rotation speed calculating means includes a formula based on which multiplying a value of the acceleration correcting coefficient by a deviation between the target maximum engine rotation speed and the aft-corrected engine rotation speed or the fore-correction engine rotation speed to allow a product on multiplication to be subtracted from the target maximum engine rotation speed for thereby calculating the aft-modified engine rotation speed.

With such a structure, the aft-modified engine rotation speed can be calculated based on the deviation among the value of the acceleration correcting coefficient, the target maximum engine rotation speed, the aft-corrected engine rotation speed or the fore-correction engine rotation speed in sequence by referring to the relationship, thereby enabling the value to be accurately calculated on a case-by-case basis.

Preferably, the relationship preliminarily stored in the aft-modified engine rotation speed calculating means includes a table enabling a calculation of the aft-modified engine rotation speed based on a value of the acceleration correcting coefficient, and a deviation between the target maximum engine rotation speed and the aft-corrected engine rotation speed or the fore-correction engine rotation speed. With such a structure, the aft-modified engine rotation speed can be calculated based on the deviation among the value of the acceleration correcting coefficient, the target maximum engine rotation speed, the aft-corrected engine rotation speed or the fore-correction engine rotation speed in sequence by referring to the table. Thus, no need arises to make the calculation on a case-by-case basis and no time needs to be taken for the calculation.

Preferably, the aft-modified engine rotation speed calculating means includes modified value limiting means i.e., a limiting portion for limiting the aft-modified engine rotation speed calculated with the aft-modified engine rotation speed calculating means to a value between an upper limit value and a lower limit value that are determined. With such a structure, the modified value limiting means limits the aft-modified engine rotation speed calculated with the aft-modified engine rotation speed calculating means to the value between upper limit and lower limit values. Thus, no remarkable modification occurs in the shift point, thereby preventing the shifting from being executed due to erroneous modification.

Preferably, the aft-modified engine rotation speed calculating means determines the aft-modified engine rotation speed based on a working oil temperature of the automatic transmission. With such a structure, it becomes possible to prevent a variation in shift timing caused by working oil with viscosities different from each other for each oil temperature.

Preferably, the shift point real-time modifying means is inoperative to modify the shift point when the shift point matches a predetermined shift-point modification interrupting condition. With such a structure, no shift point is modified in the presence of a phase corresponding to the shift-point modification interrupting condition.

BRIEF DESCRIPTION OF THE DRAWINGS

FIG. 1 is a skeleton view illustrating a vehicular automatic transmission to which shift control device of a vehicular automatic transmission of one embodiment according to the present invention is applied.

FIG. 2 is an operation table illustrating shifting operations of the automatic transmission shown in FIG. 1.

FIG. 8 is a flowchart illustrating an aft-modified engine rotation speed calculating routine executed at step SA5 in FIG. 6.

FIG. 9 is a flowchart illustrating an automatic-transmission working oil temperature reflecting routine executed at step SA4 in FIG. 6.

FIG. 15 is a flowchart, illustrating the acceleration-fluctuation detecting routine executed at step SE3 in FIG. 11, which corresponds to second fluctuation detecting means.

FIG. 16 is a flowchart, illustrating the acceleration-fluctuation detecting routine executed at step SE3 in FIG. 11, which corresponds to the second fluctuation detecting means.

FIG. 17 is a flowchart, illustrating the acceleration-fluctuation detecting routine executed at step SE3 in FIG. 11, which corresponds to the second fluctuation detecting means.

FIG. 18 is a flowchart, illustrating the acceleration-fluctuation detecting routine executed at step SE3 in FIG. 11, which corresponds to fluctuation-detection determining means.

FIG. 23 is an operation table illustrating shifting operations of the automatic transmission shown in FIG. 1, which represents a case in which the gear ratios are different than in FIG. 2.

EXPLANATION OF REFERENCES

Figure 3:
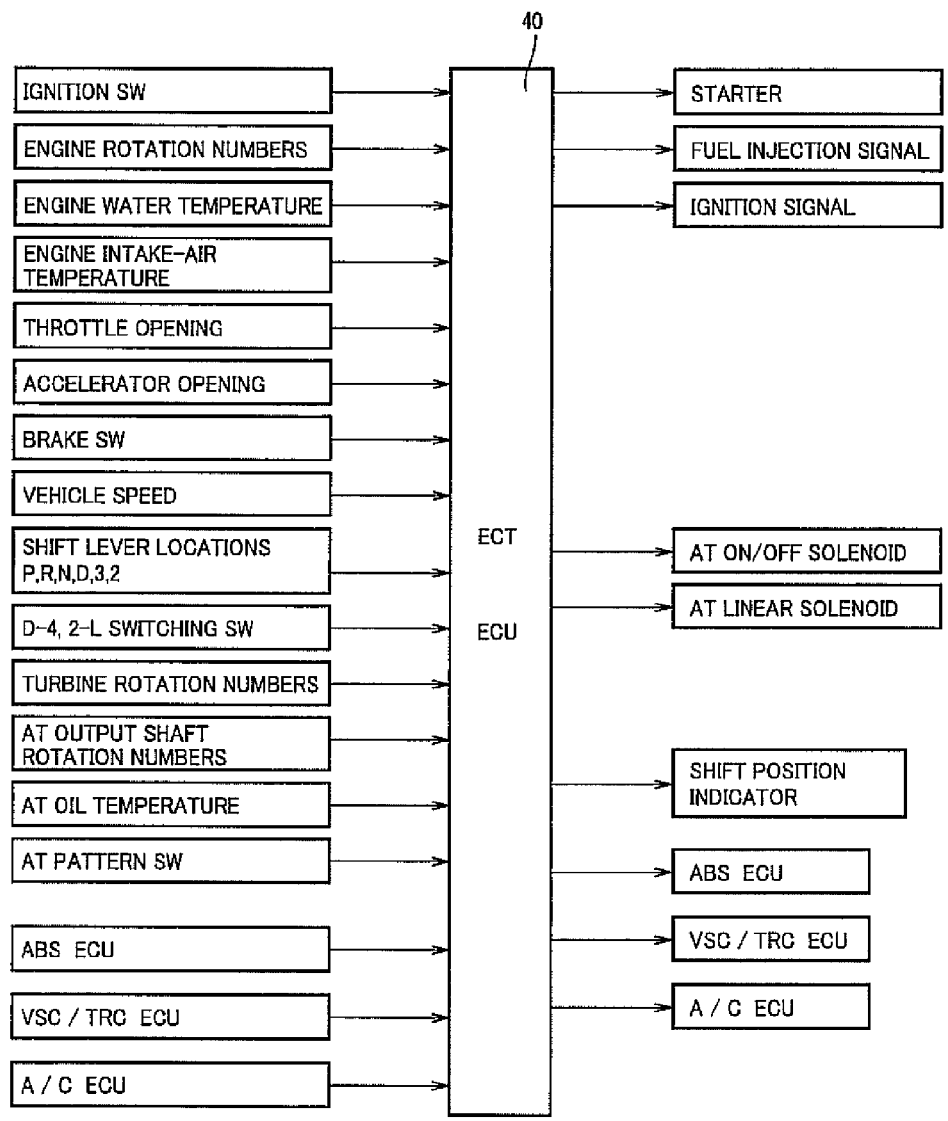
FIG. 3 is a view illustrating input and output signals to be input to or output from an electronic control device used in the embodiment shown in FIG. 1.

12: engine
16: automatic transmission
70: shift-point correcting means
82: corrected value limiting means
90: acceleration-correcting coefficient calculating means
92: aft-modified engine rotation speed calculating means
96: modified value limiting means
97: AT-oil temperature reflecting means
98: modification-execution interrupting means
102: vehicle-acceleration fluctuation detecting means

BEST MODE FOR CARRYING OUT THE INVENTION

Hereinafter, an embodiment of the present invention will be explained in detail with reference to attached drawings.

FIG. 1 schematically shows a construction of a driving apparatus for vehicle 10 to which the present invention is applied. The driving apparatus 10 has an automatic transmission for vehicle 16 and is mounted onto, e.g., an FF (front-engine, front-drive) type vehicle, and includes an engine 12 as a driving source. An output of the engine 12 constructed by an internal combustion engine is transmitted to right and left driving wheels via a torque converter 14 functioning as a hydraulic type transmitting device, the automatic transmission for vehicle 16, a differential gear unit (not shown), and a pair of axles.

The torque converter 14 includes a pump impeller 14$p$ connected to a crankshaft of the engine 12, a turbine impeller 14$t$ connected to an input shaft 32 of the automatic transmission for vehicle 16, and a stator impeller 14$s$ connected to a housing case 36 via a one-way clutch (not shown) transmitting the rotation in one direction but does not transmit the rotation in other direction. The torque converter 14 amplifies the torque produced by the engine 12 and transmits the amplified torque to the automatic transmission for vehicle 16. Between the pump impeller 14$p$ and the turbine impeller 14$t$, a lockup clutch 38 is provided. Hydraulic pressure supply to an engage-side oil chamber and a release-side oil chamber is switched by a switching valve of a hydraulic control circuit (not shown) to realize an engage state, a slip state and a release state. A completely engaged state of the lockup clutch 38 allows the pump impeller 14$p$ and the turbine impeller 14$t$ to be rotated.

The automatic transmission for vehicle 16 includes a first transmission portion 24 and a second transmission portion 30. The first transmission portion 24 is mainly constructed by a single-pinion type first planetary gear set 22. The second transmission portion 30 is mainly constructed by a single-pinion type second planetary gear set 26 and a double-pinion type third planetary gear set 28, and is coaxial with the first transmission portion 24.

The automatic transmission for vehicle 16 speed changes rotation of an input shaft 32 disposed upstream of the first planetary gear set 22, and output the speed changed rotation from an output gear 34 disposed downstream of the third planetary gear set 28. Here, the input shaft 32 corresponding to a claimed input member is a turbine shaft of a torque converter drivingly rotated by a drive source for running such as an engine. The output gear 34 corresponding to a claimed output member meshes with the differential gear unit via a counter shaft or directly to drive and rotate the left and right driving wheels. Here, the automatic transmission for vehicle 16 and the torque converter 14 have a construction substantially symmetrical with respect to a horizontal centerline, and therefore a lower half thereof is omitted in FIG. 1.

The first planetary gear set 22 constructing the first transmission portion 24 includes three rotary elements, i.e., a sun gear S1, a carrier CA1 and a ring gear R1. The sun gear S1 is connected to the input shaft 32 to be driven and rotated thereby, and the ring gear R1 is selectively connected via a third brake B3 to a housing case 36 which is a non-rotary member, the carrier CA1 functioning as an intermediate output member is rotated at a speed lower than that of the input shaft 32.

The second planetary gear set 26 and the third planetary gear set 28 constructing the second transmission portion 30 are partially connected to each other to provide four rotary elements RM1, RM2, RM3 and RM4. Specifically, a sun gear S3 of the third planetary gear set 28 provides the first rotary element RM1; respective ring gears R2 and R3 of the second and third planetary gear sets 26 and 28 are connected to each other to provide the second rotary element RM2; respective carriers CA2 and CA3 of the second and third planetary gear sets 26 and 28 are connected to each other to provide the third rotary element RM3; and a sun gear S2 of the second planetary gear set 26 provides the fourth rotary element RM4.

Thus, the second planetary gear set 26 and the third planetary gear set 28 provide a Ravigneaux-type planetary gear train in which the respective ring gears R2 and R3 of the second and third planetary gear sets 26 and 28 are constituted integrally with each other; the respective carriers CA2 and CA3 of the second and third planetary gear sets 26 and 28 are constituted by a common member; and the pinion gears of the second planetary gear set 26 also function as the second pinion gears of the third planetary gear set 28.

The first rotary element RM1 (sun gear S3) is selectively connected by the first brake B1 to the housing case 36 to be inhibited from being rotated relative thereto, and the second rotary element RM2 (ring gears R2 and R3) is selectively connected by the second brake B2 to the housing case 36 to be inhibited from being rotated relative thereto. The fourth rotary element RM4 (sun gear S2) is selectively connected by the first clutch C1 to the input shaft 32 to be rotated integrally therewith, and the second rotary element RM2 (ring gears R2 and R3) is selectively connected by the second clutch C2 to the input shaft 32 to be rotated integrally therewith.

The first rotary element RM1 (sun gear S3) is integrally connected to the carrier CA1 of the first planetary gear set 22 functioning as the intermediate output member to be rotated integrally therewith thereby outputting the rotation, and the third rotary element RM3 (carriers CA2 and CA3) is integrally connected to the output gear 34 to be rotated integrally therewith thereby outputting the rotation. The first to third brakes B1 to B3, and the first and second clutches C1 and C2 are multiple disc hydraulic type frictional engagement apparatus which are engaged and released by hydraulic cylinders.

The operation table, shown in FIG. 2, is a view summarizing the relationships among the various gear positions and the clutches C1 and C2 and the brakes B1 to B3. Reference to "○" designates engagement and reference to "⊚" designates the engagement established only during engine braking. Speed ratios for various gear positions are suitably determined in accordance with various gear ratios ρ1, ρ2 and ρ3 of the first planetary gear unit 22, the second planetary gear unit 26 and the third planetary gear unit 28. Suppose, for instance, ρ1≈0.45, ρ2≈0.38 and ρ3≈0.41, the speed ratios can be established as shown in FIG. 2. Steps in gear ratios (ratios between the speed ratios among the various gear positions) have values that are nearly appropriate and a total speed ratio (=3.62/0.59) has a width that is great as high as a value of approximately 6.1. In addition, a rear drive gear position "Rev" has an appropriate speed ratio and, thus, an appropriate speed-ratio characteristic can be obtained as a whole.

With the vehicular automatic transmission 16 of the present embodiment, thus, the three sets of planetary gear sets 22, 26 and 28, the two clutches C1 and C2 and the three brakes B1 to B3 are employed to achieve multi-stage shifting for forward drive six gear positions. This enables reductions in weight, cost and axial length of the automatic transmission by an extent equivalent to a reduction of the clutch in contrast to the structure including the three clutches and the two brakes.

Particularly, the second planetary gear set 26 of a single pinion type and the third planetary gear set 28 of a double pinion type, constituting the second shift portion 30, are formed in a planetary gear train of a Ravigneaux type, resulting in further reductions in the number of component parts and axial length.

FIG. 3 is a view showing inputs and outputs applied to or delivered from an electronic control device 40 functioning as an automatic shifting control device for controlling the shifting in the automatic transmission 16. As shown in FIG. 3, the electronic control device 40 is applied with various signals including: a switch-on signal delivered from an ignition switch; a signal indicating an engine rotation speed NE delivered form an engine rotation speed sensor; a signal indicating an engine water temperature Tw delivered from an engine water temperature sensor; a signal indicating an engine intake-air temperature Ta delivered from an engine intake-air temperature sensor; a signal indicating a throttle opening θ th delivered from a throttle-opening sensor; and a signal indicating an accelerator-opening θ acc delivered from an accelerator-opening sensor.

In addition to the above signals, the electronic control device 40 is also applied with: a signal indicating a braking-operation initiated with a brake switch; a signal indicating a vehicle speed delivered from a vehicle speed sensor; a signal indicating a fore-and-aft location of a shift lever delivered from a shift-lever position sensor; a signal indicating a left-and-right position of the shift lever delivered from the shift lever position sensor; a signal indicating a rotation speed Nt of a turbine wheel 14t delivered from a turbine rotation sensor; a signal indicating a rotation speed Nout of an output gear (output shaft) of the automatic transmission 16; a signal indicating an oil temperature Toil of the automatic transmission 16; a signal indicating an operated-position of a shift-pattern changeover switch; a signal delivered from an ABS electronic control device; a signal delivered from a VSC/TRC electronic control device; and a signal delivered from an A/C electronic control device, etc.

The electronic control device 40 is a so-called microcomputer provided with, for example, a CPU, a RAM, a ROM and an input/output interface, etc., to perform signal processing on input signals in accordance with a program preliminarily stored in the ROM. Then, the electronic control device 40 outputs various signals including: a drive signal for a starter; a fuel-injection signal for a fuel injection valve, signals for solenoids of shifting-control ON-OFF valves of the automatic transmission 16; signals for solenoids of hydraulic pressure-control linear solenoid valves of the automatic transmission 16; a display signal for a shift-position indicator; a signal for the ABS electronic control device; a signal for the VSC/TRC electronic control device; and a signal for the A/C electronic control device, etc.

Figure 4:
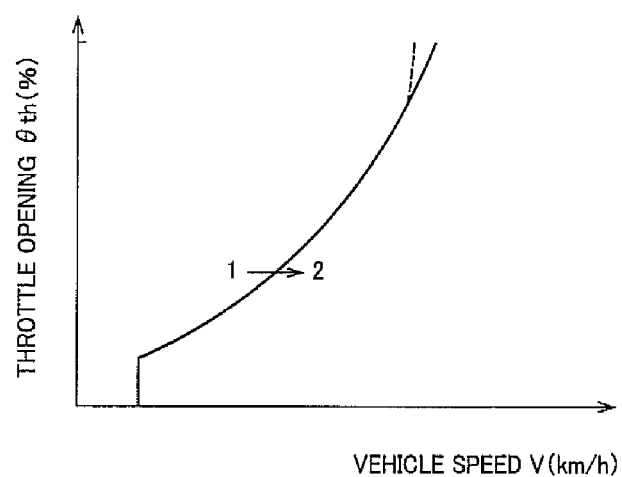
FIG. 4 is a view illustrating a part of a shifting diagram to be used in shifting control executed with the electronic control device shown in FIG. 3.

The electronic control device 40 executes a shift determination based on an actual vehicle speed V and the accelerator-opening θ acc or the throttle opening θ th by referring to, for instance, a preliminarily stored shifting diagram a part of which is shown in FIG. 4. Then, a shifting output is performed for driving a shift control ON/OFF valve for executing the determined shifting. A 1→2 shift line, shown in FIG. 4, has, for instance, the maximum accelerator-opening θ accmax that is determined so as to allow a vehicle to obtain the maximum drive power (output) during a full-throttle upshifting representing an upshifting initiated at a full throttle opening wherein the accelerator-opening θ acc or the throttle opening θ th lies at a value of 100% or in the vicinity thereof during a flat road running.

Further, even when performing the full-throttle upshifting under a running state of the vehicle wherein a remarkable variation takes place in running resistance like those of, for instance, a climbing-road running, a descending-road running and a traction-running, etc., the electronic control device 40 executes controls as described below to allow the vehicle to obtain the maximum drive power (output). That is, the shifting output is performed at optimal timing so as to allow the engine rotation speed NE to achieve a high rotation speed within a range not to fall in a predetermined red zone or a fuel-cutoff range determined beyond such a red zone. In an alternative, a predetermined shifting line (shifting pattern) may be updated to allow the shifting output to be performed at the optimal timing in a subsequent full-throttle upshifting.

Figure 5:
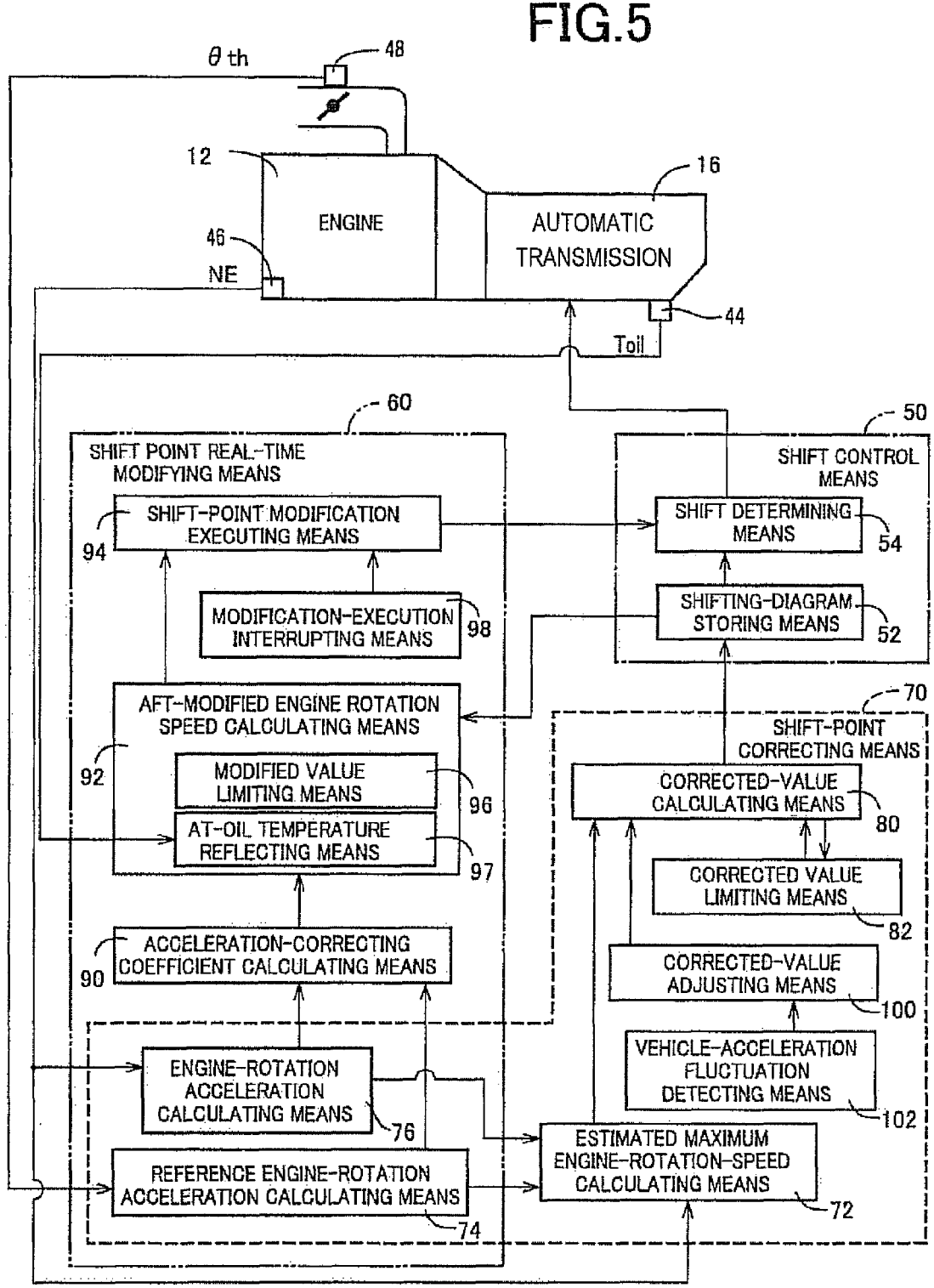
FIG. 5 is a functional block diagram illustrating a major control function to be executed by the electronic control device shown in FIG. 3.

FIG. 5 is a functional block diagram illustrating a major control function of the electronic control device 40. In FIG. 5, the electronic control device 40 is divided in terms of functions into shift control means 50 and shift point real-time modifying means 60 and, in addition to these, shift-point correcting means 70. The shift control means 50 includes shifting-diagram storing means 52, operative to preliminarily store the shifting diagram, and shift determining means 54 operative to execute the shift determination based on a vehicle traveling condition, i.e., for instance, the actual vehicle speed V and the accelerator-opening θ acc or the throttle opening θ th by referring to, for instance, the shifting diagram preliminarily stored in the shifting-diagram storing means 52. The shifting output is performed for driving the shift control ON/OFF valve to execute the shift being determined. In addition, the shifting-diagram storing means 52 is operative to suitably correct the preliminarily stored shifting diagram depending on an output of the shift-point correcting means 70 that will be described later. The shift determining means 54 is operative to perform the shifting output on consideration of the shift point modified with shift-point modification executing means 94 that will be described later.

The shift-point correcting means 70 includes reference engine-rotation acceleration calculating means 74, engine-rotation acceleration calculating means 76, estimated maximum engine-rotation-speed calculating means 72, vehicle-acceleration fluctuation detecting means 102, learning and corrected-value adjusting means 100, corrected-value limiting means 82 and corrected-value calculating means 80. With the use of these means, the learning is made based on the shifting on an actual running and, depending on such a result, the shifting diagram, stored in the shifting-diagram storing means 52, is corrected. That is, the learning control means 70 estimates an estimated maximum engine rotation speed in that is obtained by substituting the maximum value of the engine rotation speed subsequent to the upshifting output occurring during a power-on running mode to a value in a reference running state having no impact on acceleration of the vehicle. Thereafter, the learning and corrected value is calculated based on a deviation between the estimated maximum engine rotation speed and a targeted maximum engine rotation speed.

The reference engine-rotation acceleration calculating means 74 calculates a value of engine-rotation acceleration A2 (rad/sec2) representing engine-rotation acceleration at an upshift-determining timing under the reference running state. The term "running state" includes at least one of, for instance, the vehicle speed V, the throttle opening θ th detected by the sensor 48 and input torque Tin of the automatic transmission 16. As used herein, the term "reference engine-rotation acceleration" refers to rotation acceleration of the engine 12 with the vehicle running on a road surface of a gradient 0% representing the reference running state having no impact on acceleration of the vehicle, i.e., a predetermined in-vehicle reference numbered occupant state such as a state in which, for instance, only a driver gets on the vehicle with a given weight. With the present embodiment described above, this corresponds to engine-rotation acceleration A2 under the reference running state calculated based on the running state at the upshift-determining timing.

The engine-rotation acceleration calculating means 76 calculates rotation acceleration A (rad/sec2) of the engine 12 at the upshift-determining timing. With the present embodiment described above, a value of engine-rotation acceleration A can be obtained by sequentially calculating a variation rate of dNE/dt per minimal unit time of the engine rotation speed NE detected with the engine rotation speed sensor 46 mounted on the engine 12. Moreover, usually, the engine rotation speed NE has an increasing fluctuation (noise). Providing a smoothing filter or the like (not shown) allows the engine rotation speed NE, subjected to filtering processing such as moving average, to be used.

The estimated maximum engine-rotation-speed calculating means 72 calculates an estimated maximum engine rotation speed NEc at reference engine-rotation acceleration A2 calculated with the reference engine-rotation acceleration calculating means 74. More particularly, the estimated maximum engine-rotation-speed calculating means 72 calculates the estimated maximum engine rotation speed NEc using a formula (1) expressed below. This calculation is executed by referring to the reference engine-rotation acceleration A2 calculated with the reference engine-rotation acceleration calculating means 74, engine-rotation acceleration A1 at an upshifting output timing calculated with the engine-rotation acceleration calculating means 76, the rotation speed NE1 of the engine 12 at the upshifting output timing calculated with the engine rotation speed sensor 46, and the rotation speed NE2 of the engine 12 at an inertia phase start timing during the execution of the upshifting.

$$NEc = NE1 + (NE2 - NE1) \times A2/A1 \quad (1)$$

The corrected-value limiting means 82 suitably executes the limitation during the execution of the learning and corrected value calculating means 80 that is described below. A query is made as to whether values of a shift point learning value ΔG per one time, used in the learning and corrected value calculating means 80, and/or a total learning volume G (N), subsequent to the learning, exceed a predetermined value, upon which if the answer to this query is yes, then, the limitation is executed to cause these values to satisfy the range mentioned above.

Considering, for instance, the value ΔG, the shift point learning value ΔG per one time, calculated with the learning and corrected value calculating means 80 (described below) is, after calculation, delivered to the corrected-value limiting means 82 before it is used in actual learning. In addition, by using two predetermined constants ΔGmin and ΔGmax, a query is made as to whether the value ΔG exceeds the above-described range determined to satisfy the relationship expressed as ΔGmin≦ΔG≦ΔGmax. Then, so-called guard processing is executed such that if the value ΔG exceeds an upper limit Gmax, then the relationship is established as ΔG=ΔGmax and, if the value ΔG falls below a lower limit ΔGmin, then the relationship is established as ΔG=ΔGmin. In contrast, if the value ΔG satisfies the above-described range, no specific processing is executed.

The value ΔG, processed in a manner set forth above, is returned to the learning and corrected-value calculating means 80 for actual learning to be executed. For the total learning volume G (N) resulting from the learning, the learning and corrected-value calculating means 80 (described below) calculates the total learning volume G (N) and, thereafter, the total learning volume G (N) is delivered to the corrected-value limiting means 82 before it is used in correcting the shift point. In addition, by using two predetermined constants ΔGmin and ΔGmax, a query is made as to whether the value ΔG exceeds the above-described range determined to satisfy the relationship expressed as Gmin≦G (N)≦Gmax. Then, so-called guard processing is executed such that if the value G (N) exceeds the upper limit Gmax, then the relationship is established as G (N)=Gmax and, if the value ΔG falls below the lower limit ΔGmin, then the relationship is established as G (N)=Gmin. In contrast, if the value G (N) satisfies the above-described range, no specific processing is executed. The value G (N), processed in a manner set forth above, is returned to the learning and corrected-value calculating means 80 and, subsequently, no shift point is corrected.

The learning and corrected-value calculating means 80 calculates a deviation ΔNE1 between the estimated maximum engine rotation speed NEc, calculated with the estimated maximum engine-rotation-speed calculating means 72, and a target maximum engine rotation speed NEd each time the shifting is executed one time. Thereafter, the learning is executed depending on a magnitude of the deviation ΔNE1, thereby permitting the shift point, stored in the shifting-diagram storing means 52, to be corrected. As used herein, the term "target maximum engine rotation speed NEd" refers to a determined rotation speed, which the rotation speed of the engine 12 does not exceed but approaches as close as possible at timing before and after the inertial phase, resulting from the shifting, begins. For instance, such a predetermined rotation speed is set to a value lower than a fuel-cutoff rotation speed NEfcut determined not to sacrifice durability of the engine 12, more preferably, closer to the predetermined rotation speed but lower by a given value than a lower limit NEred of a red zone of the engine 12 determined to be lower than the predetermined rotation speed.

More particularly, first, the shift point learning value ΔG (=K×ΔNE1, where K represents a learning correcting coefficient (also referred to as "learning gain"), determining the weight of the learning, which is preliminarily given) per one time is determined based on the deviation ΔNE1. Then, by adding ΔG, calculated in such a way and subjected to guard processing with the corrected-value limiting means 82 depending on needs, to the total learning volume G (N−1), the total learning volume, to which the learning on the current shifting is added, can be obtained as G (N) (=G (N−1)+ΔG). Subsequently, the resulting calculated total learning volume G (N) is subjected to the guard processing by the corrected-value limiting means 82 depending on needs.

Further, the learning and corrected-value calculating means 80 executes the calculation to correct the shifting diagram, stored in the shifting-diagram storing means 52, based on the total learning volume G (N) subjected to the guard processing executed with the corrected-value limiting means 82 depending on needs. That is, the learning is executed to modify, for instance, the shifting diagram shown in FIG. 4, such that a solid line is modified to a broken line, i.e., the upshift point is corrected to, for instance, the 1→2 upshift point by referring to the total learning volume G (N) being learnt. This allows the maximum output to be obtained during a determined full-throttle upshifting regardless of the vehicle remaining under the running state with a remarkable variation in running resistance such as the climbing-road running, the descending road running and the traction running.

When this takes place, the shift point is corrected such that the greater the deviation ΔNE1 between the estimated maximum engine rotation speed NEc and the target maximum engine rotation speed NEd, the greater will be the deviation toward a higher vehicle speed. That is, the correction, shown in FIG. 4, represents a case in which ΔNE1 takes a negative value to designate a situation under which an original shift point is corrected to a shift point on a lower vehicle speed. In addition, data applied to the learning and corrected-value calculating means 80 in executing the learning, is ΔNE1, i.e., a deviation of the engine rotation speed. Meanwhile, the learning volume ΔG per one time, which represents a value to be actually learnt with the learning and corrected-value calculating means 80, and the total learning volume G (N), indicative of a value calculated with the learning and corrected-value calculating means 80 to be used for correcting the shift point, represent the vehicle speed as shown in FIG. 4. Accordingly, these factors are different in dimension. However, these factors may be separately converted simultaneously with the operation in which the weight of the learning is determined based on the learning and correction coefficient K or a general method that is not particularly designated.

The vehicle-acceleration fluctuation detecting means 102 detects the presence of fluctuation when such fluctuation occurs in acceleration "a" (m/sec) of the vehicle. Further, when the vehicle-acceleration fluctuation detecting means 102 detects vehicle acceleration "a", the learning and corrected-value adjusting means 100 allows the learning and corrected-value calculating means 80 to adjust the various factors depending on a magnitude of fluctuation da/dt of vehicle acceleration "a" detected in value of the total learning volume G (N) calculated by the learning and corrected-value calculating means 80. This adjustment is made such that, for instance, the greater the value of fluctuation da/dt of vehicle acceleration "a", the smaller will be the learning and correction coefficient K and the magnitudes of guard values ΔGmax and ΔGmin used in executing the guard processing. This results in a reduction in an influence on an entire learning result of the learning result in the presence of an increase in fluctuation da/dt of vehicle acceleration "a" and no learning is interrupted even in the presence of an increase in fluctuation da/dt of vehicle acceleration "a". Moreover, these detailed operations will be described below Shift point real-time modifying means 60 includes the reference engine-rotation acceleration calculating means 74, the engine-rotation acceleration calculating means 76, acceleration-correcting coefficient calculating means 90, aft-modified engine rotation speed calculating means 92, modified value limiting means 96, shift-point modification executing means 94 and modification-execution interrupting means 98. These means allows the shift point, corrected with the shift-point correcting means 70, to be modified on a real time basis depending on variation in acceleration of the vehicle. That is, the shift point real-time modifying means 60 modifies the shift point, altered based on the actual engine-rotation acceleration at the upshift determining timing during the power-on running mode and the reference engine-rotation acceleration, representing a value of the actual engine-rotation acceleration substituted to a value for the reference running state that does not influence on acceleration of the vehicle, on the real time basis.

Figure 22:
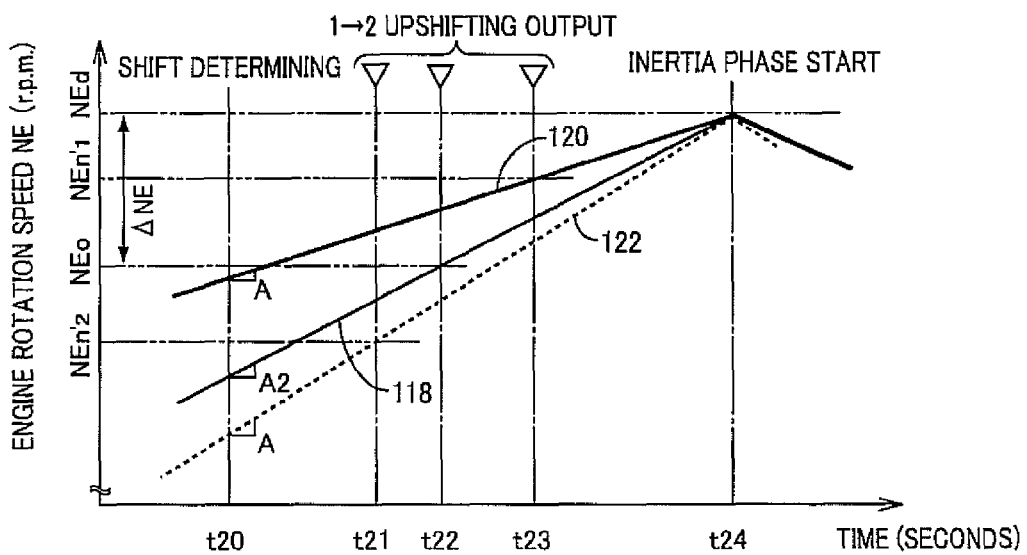
FIG. 22 is a timing chart, illustrating the major control operations executed with the electronic control device shown in FIG. 3, which represents a case under which the embodiment of the present invention is not applied.

Further, the shift point real-time modifying means 60 modifies the shift point, as shown in FIG. 22, such that if the engine-rotation acceleration related value lies at a high value, then, the shifting is initiated at a lower vehicle speed than that achieved when the engine-rotation acceleration related value lies at a low value. In addition, the shift point real-time modifying means 60 corrects the shift point based on the magnitude of the engine-rotation acceleration related value. That is, when the engine-rotation acceleration related value remains at the high level, the shift point real-time modifying means 60 correct the shift point to a lower level than that achieved when the engine-rotation acceleration related value remains at a low level. In addition, with the present embodiment, the engine rotation speed is employed as the engine-rotation acceleration related value.

The acceleration-correcting coefficient calculating means 90 calculates an acceleration correcting coefficient γ representing a ratio between a value of the engine-rotation acceleration A, calculated with the engine-rotation acceleration calculating means 76, and a value of engine-rotation acceleration A2 calculated with the reference engine-rotation acceleration calculating means 74.

The aft-modified engine rotation speed calculating means 92 calculates an aft-modified engine rotation speed NEn representing the engine rotation speed at the shift point being corrected. That is, the aft-modified engine rotation speed NEn is calculated using a preliminarily stored relational expression based on the acceleration correcting coefficient γ calculated with the acceleration-correcting coefficient calculating means 90 and the deviation ΔNE2 (=Ned−NEo) between the target maximum engine rotation speed NEd and the aft-corrected engine rotation speed NEo, representing the engine rotation speed at the shift point, resulting after the correction, which is calculated with the shift-point correcting means 70.

Here, the target maximum engine rotation speed NEd represents a rotation speed that is predetermined so as to approach a value of the rotation speed of the engine 12 on a stage before and after an initiation timing for the inertia phase caused by the shifting that does not exceed the predetermined rotation speed to be as close as possible. The target maximum engine rotation speed NEd is set to, for instance, a value lower than the fuel cutoff rotation speed NEfcut determined not to sacrifice durability of the engine 12, i.e., preferably, a value lower than the lower limit NEred of the red zone of the engine 12 by a given value that is determined to be lower than the fuel cutoff rotation speed NEfcut.

Here, the preliminarily stored relational expression, stored in the aft-modified engine rotation speed calculating means 92 is used for multiplying, for instance, the acceleration correcting coefficient γ by the deviation ΔNE2 between the target maximum engine rotation speed NEd and the aft-corrected engine rotation speed NEo at the shift point corrected based on the aft-corrected engine rotation speed NEo. Product of multiplication if subtracted from the target maximum engine rotation speed NEd. Such a formula (2) is expressed as:

$$NEn = NEd - (NEd - NEo) \times A/A2 \qquad (2)$$

The modified value limiting means 96 executes the limitation in conformity to the execution of the aft-modified engine rotation speed calculating means 92. If a value of the aft-corrected engine rotation speed NEn, calculated with the aft-modified engine rotation speed calculating means 92, exceeds the above-described range, then, the limitation is initiated to allow such a value to satisfy the above-described range. In particular, if the aft-modified engine rotation speed calculating means 92 calculates a value of the aft-corrected engine rotation speed NEn, then, the value of NEn is delivered to the modified value limiting means 96. The modified value limiting means 96 makes a query as to whether the value of NEn exceeds the above-described range determined in the relationship expressed as NEnmin≦NEn≦NEnmax defined in terms of the two constants NEnmin and NEnmax.

The guard processing is executed such that if NEn exceeds the upper limit NEnmax of the above-described range, the value of the aft-corrected engine rotation speed NEn is set to a new upper limit NEnmax (NEn=NEnmax) of the above-described range and if NEn falls below the lower limit NEnmin of the above-described range, the value of the aft-corrected engine rotation speed NEn is set to a new lower limit NEnmin (NEn=NEnmin) of the above-described range. In contrast, if NEn satisfies the above-described range, no specific operation is executed. NE, subjected to the above operations, is subsequently used as the aft-modified engine rotation speed NEn.

The AT oil temperature reflecting means 97 executes oil temperature reflection in conformity to the execution of the aft-modified engine rotation speed calculating means 92. The operation is executed to reflect an impact of viscosity or the like of working oil, varying depending on the temperature Toil of working oil filled in the automatic transmission 16 at the shift point determining timing, on the value of the aft-corrected engine rotation speed NEn calculated with the aft-modified engine rotation speed calculating means 92. More particularly, the operation is executed to multiply the value of the aft-modified engine rotation speed NEn by a coefficient μ predetermined for the temperature Toil of working oil filled in theautomatic transmission 16. The temperture Toil is detected by temperature sensor 44. In addition, a resulting numeric value NEn' (=NEn×μ) is assigned to be a new aft-modified engine rotation speed. Moreover, as used herein, the term "predetermined coefficient μ" refers to, for instance, a value obtained on experimental tests by referring to the relationship between time, required for the shifting output to be initiated by the automatic transmission 16 and the inertia phase to begin, and the temperature Toil of working oil filled in the automatic transmission 16 at that time.

The shift-point modification executing means 94 allows the shift determining means 54 to modify the shift point such that the shifting output is initiated at the value of the aft-modified engine rotation speed NEn' calculated with the aft-modified engine rotation speed calculating means 92. That is, the shifting output is initiated at the timing when the engine rotation speed reaches the aft-modified engine rotation speed NEn'.

The modification-execution interrupting means 98 allows the shift-point modification executing means 94 to interrupt the modification of the shift point in the presence of a situation corresponding to a predetermined shift-point modification interrupting condition. Here, the predetermined shift-point modification interrupting condition is constituted with either one of or a plurality of conditions listed below. For instance, a determination is made that the vehicle is running on a punishing road under conditions wherein: the upshift determination timing has no elapse of a predetermined fixed period "td" since the downshifting, executed immediately before the upshift determination timing; and a fluctuation rate of dNout/dt per minimal unit time of the output shaft revolution Nout of the automatic transmission 16 is greater than, for instance, a predetermined value, etc.

This corresponds to a case wherein the upshifting, related to the shift point modified, is executed immediately after the downshifting with an increasing variation in engine rotation numbers. That is, when the downshifting is initiated with a full accelerator-opening like a kickdown, a variation in engine rotation speed increases. Therefore, attempting to modify the shift point on a subsequent upshifting causes the shift point to be extensively modified on a lower vehicle speed side (lower engine rotation speed). As a result, an unintended erroneous reflection, such as a so-called busy-shifting, occurs with the upshifting being initiated immediately after the downshifting. Thus, if the situation belongs to the shift-point modification interrupting condition, then, the modification-execution interrupting means 98 inhibits the shift-point modification executing means 94 from modifying the shift point.

Figure 6:
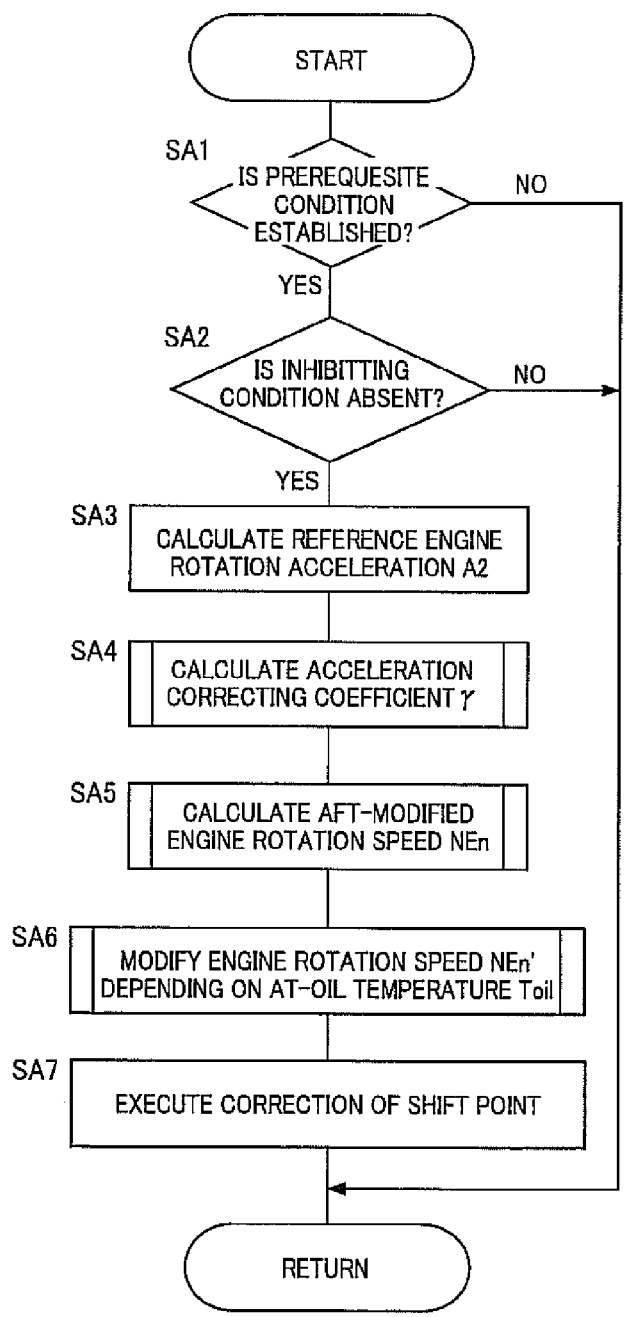
FIG. 6 is a flowchart illustrating major control operations to be executed with the electronic control device shown in FIG. 3.

FIGS. 6 to 9 and FIGS. 11 to 20 are flow charts illustrating a major control operation to be executed by the electronic control device 40, i.e., one example of a control operation of modifying the shift point. In FIG. 6, at step (hereinafter, the term "step" will be omitted) SA1, a query is made as to whether a prerequisite is established as a precondition to execute a current control. This executing condition includes either one of or a plurality of conditions listed below. That is, for instance, the throttle opening θth is greater than a given value (of, for instance, 100% or at a value in the vicinity thereof); the oil temperature Toil of working oil filled in the automatic transmission 16 is greater than a given value; and a given running mode such as a toeing mode or the like is applied, etc. If the answer to SA1 is yes, i.e., when the executing condition is satisfied, the operation at succeeding SA2 is executed. Further, if the answer to SA1 is no, then, no current control is executed and the current flow chart is completed.

At SA2 corresponding to the modification-execution interrupting means 98, a query is made as to whether a current status belongs to a shift-point modification interrupting condition i.e., inhibiting condition for interrupting the modification of the shift point on the current control. The shift-point modification interrupting condition includes either one of or a plurality of conditions described below. That is, examples of such condition include: no predetermined fixed time period "td" has elapsed since, for instance, the downshifting; and a determination made that the vehicle is running on the punishing road when a variation rate of dNout/dt of an output shaft rotation speed Nout of, for instance, the automatic transmission 16 per minimal unit time, etc. If the answer to SA2 is yes, i.e., when no current status belongs to the shift-point modification interrupting condition, then, the shift point correction control of the present invention is executed in operations subsequent to succeeding SA3. On the contrary, if the answer to SA2 is no, no current control is executed and the current flow chart is completed.

At SA3 corresponding to the engine-rotation acceleration calculating means 76 and the reference engine-rotation acceleration calculating means 74, engine-rotation acceleration A and engine-rotation acceleration AM are calculated. That is, first at SA3, engine-rotation acceleration A is calculated as the variation dNE/dt of the engine rotation speed NE per minimal unit time which is measured with the engine rotation sensor 46 at the upshift-determining timing. In addition, engine-rotation acceleration A2 is calculated by referring to the relationship preliminarily obtained on experimental tests and stored based on at least one of the running conditions, such as, for instance, the vehicle speed V, the throttle opening θth and input torque Tin of the automatic transmission 16, of the vehicle at the upshift-determining timing.

Figure 7:
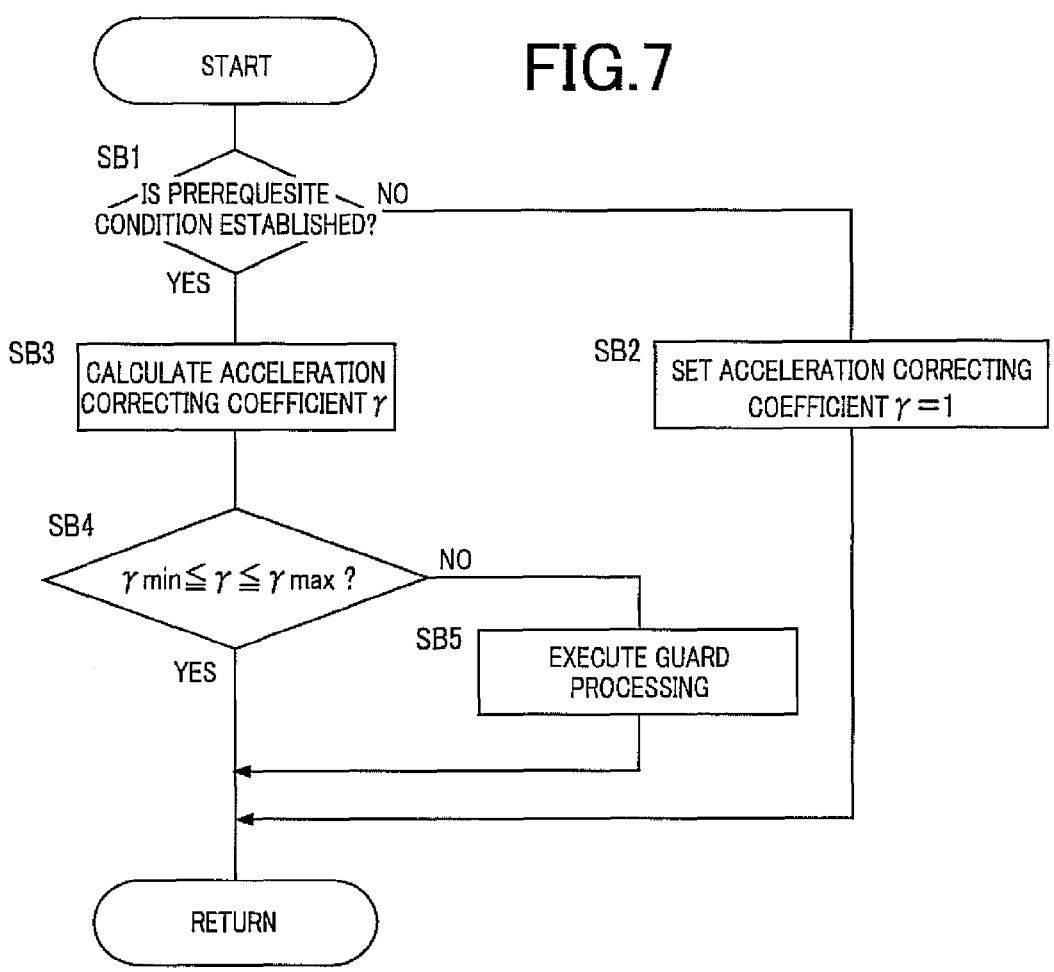
FIG. 7 is a flowchart illustrating an acceleration correcting coefficient calculating routine executed at step SA4 in FIG. 6.

At SA4 corresponding to the acceleration-correcting coefficient calculating means 90, an acceleration-correcting coefficient calculating routine, shown in FIG. 7, is executed to calculate the acceleration correcting coefficient γ. In the acceleration-correcting coefficient calculating routine, shown in FIG. 7, first at SB1, a query is made as to whether the executing prerequisite is satisfied. The term "prerequisite" refers to a state under which a driver operates, for instance, an acceleration-correction selecting switch (not shown) in a turn-on state, etc. If the current determination is yes, then, operations subsequent to SB3 are executed. If the current determination is no, then, the operation is executed at SB2.

At SB2, a value of the acceleration correcting coefficient is set to be γ=1 to interrupt the acceleration correction. That is, although if γ=1, the operation is routed back to the routine, shown in FIG. 6, after the end of the current routine, there is a result in which no correction of the shift point is executed. Meanwhile, at SB3, the acceleration correcting coefficient γ is calculated as γ=A/A2 by referring to engine-rotation acceleration A and engine-rotation acceleration A2 at the upshift-determining timing calculated at SA3 that is previously executed.

Further, at SB4 executed on a stage subsequent to SB3, a query is made as to whether the acceleration correcting coefficient γ calculated at SB3, satisfies a predetermined range of γmin≦γ≦γmax. If the current determination is no, i.e., when γ does not satisfy the above-described range, then, the operation at SB5 is executed. In contrast, if γ exceeds an upper limit γmax, a value of γ is updated to be γmax. On the contrary, if γ falls below a lower limit γmin, then, the value of γ is updated to be γmin. If the answer to SB4 is yes, then, the acceleration correcting coefficient γ calculated at SB3, used intact. With those steps mentioned above, the acceleration correcting coefficient γ is calculated and the current routine is ended.

Turning back to FIG. 6, at SA5 corresponding to the aft-modified engine rotation speed calculating means 92 and the modified value limiting means 96, an aft-modified engine rotation speed calculating routine, shown in FIG. 8, is executed. In the aft-modified engine rotation speed calculating routine shown in FIG. 8, first at SC1, the operation is executed to read out an engine rotation speed NEo at an aft-corrected shift point calculated with the shift-point correcting means 70. As used herein, the term "aft-corrected shift point" refers to a shift point learnt with the shift-point correcting means 70 and appearing after the learning and correction is made depending on piece-to-piece variations of the automatic transmissions 16. Such a value can be read out by referring to, for instance, the shifting diagram stored in the shifting-diagram storing means 52 altered with the shift-point correcting means 70.

At consecutive SC2, the aft-modified engine rotation speed NEn is calculated using the preliminarily stored relational expression, for instance, the formula (2) mentioned above by referring to the acceleration correcting coefficient γ calculated at SA4, NEo read out at SC1 and a predetermined target maximum engine rotation speed NEd.

Succeeding SC3 to SC5 correspond to the modified value limiting means 96. First at SC3, an upper limit NEnmax and a lower limit NEnmin are set to determine a range for the modified value to be satisfied. For instance, for the upper limit NEnmax, use is made of either small value (min (NEo+α1, NEd)) of a sum (NEo+α1, NEd) of a given value α1 determined in advance and the engine rotation speed NEo at the aft-corrected shift point calculated with the shift-point correcting means 70, and the targeted maximum engine rotation speed NEd. For the lower limit NEnmin, use may be made of a value in which a given value α2 determined in advance is subtracted from the engine rotation speed NEo at the aft-corrected shift point calculated with the shift-point correcting means 70.

At SC4, a query is made as to whether the aft-modified engine rotation speed NEn, calculated at SC2, satisfies the range, i.e., NEnmin≦NEn≦NEnmax, defined with NEnmax and NEnmin determined at SC3. If the answer to this query is no, SC5 is executed. In contrast, if the answer to this query is yes, NEn calculated at SC2 is used intact as the aft-modified engine rotation speed.

At SC5, if a value of the aft-modified engine rotation speed NEn, calculated at SC2, exceeds NEnmax determined at SC3, the value of NEn is updated to be NEnmax (NEn=NEnmax).

On the contrary, if the value of NEn falls below NEnmin, the value of NEn is updated to be NEnmin (NEn=NEnmin) to execute the so-called guard processing. With the steps executed as set forth above, as the NEn is determined, the current routine is completed.

Turning back to FIG. 6, at SA6 corresponding to the AT oil temperature reflecting means 97, an automatic-transmission working-oil reflecting routine, shown in FIG. 9, is executed. With the automatic-transmission working-oil reflecting routine shown in FIG. 9, at SD1, the value of the aft-modified engine rotation speed NEn, calculated at SA5, is corrected depending on a value of the oil temperature Toil of working oil in the automatic transmission at the upshift-determining timing. Executing such correction allows an aft-modified engine rotation speed NEn', appearing after the oil temperature is reflected, to be obtained. In this case, upon multiplying the value of the aft-modified engine rotation speed NEn, calculated at SAS, by the correcting coefficient μ using the relationship between the stored oil temperature Toil, preliminarily obtained on experimental tests, of working oil of the automatic transmission 16 and the correcting coefficient μ, the calculation is initiated as expressed as NEn'=NEn×μ.

Turning back to FIG. 6, at SA7 corresponding to the shift-point modification executing means 94, the shift point is modified in a manner described below. That is, the correction is made so as to allow the shift determining means 54 to initiate the shifting output. This is initiated at a timing when, for instance, the accelerator-opening lies at a fill opening state or a nearly full opening state and the rotation speed of the engine 12 reaches the aft-modified engine rotation speed NEn', calculated at SA6, which reflects the oil temperature Toil of working oil of the automatic transmission 16. Further, for instance, the shift point is plotted on a coordinate defined on a plane with axes in terms of the vehicle speed (km/h) and the accelerator-opening θacc (%) as shown in FIG. 4. Thus, the aft-modified engine rotation speed NEn' (rpm) has a unit suitably converted in consideration of the gear ratios and the modification of the engine rotation numbers is reflected on the shifting line as expressed by, for instance, a broken line in FIG. 4.

Figure 10:
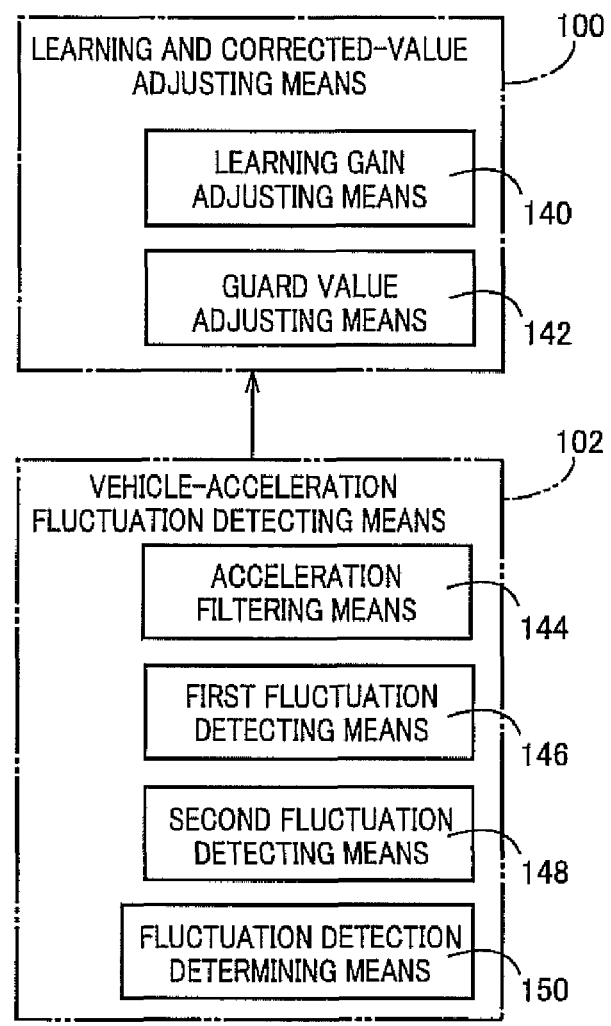
FIG. 10 is a functional block diagram illustrating detailed control functions of learning and correction value adjusting means 100 and vehicle-acceleration fluctuation detecting means shown in FIG. 5.

FIG. 10 is a functional block diagram illustrating a major part of a detailed control function of the learning and corrected-value adjusting means 100 and the vehicle-acceleration fluctuation detecting means 102. As shown in FIG. 10, the learning and corrected-value adjusting means 100 includes learning gain adjusting means 140 and guard value adjusting means 142. In addition, the vehicle-acceleration fluctuation detecting means 102 includes acceleration filtering means 144, first fluctuation detecting means 146, second fluctuation detecting means 148 and fluctuation detection determining means 150, etc.

Under a circumstance where the vehicle-acceleration fluctuation detecting means 102 detects a fluctuation in the vehicle acceleration "a", the learning gain adjusting means 140 allows a value of a learning gain K, used for the learning and corrected value calculating means 80, to be set to a value K' smaller than that used under a circumstance where no fluctuation of the vehicle acceleration is detected. Here, K' is defined as, for instance, K'=K×α where α represents a coefficient for determining a degree of reduction and is preliminarily determined to be, for instance, 0.5.

When the vehicle-acceleration fluctuation detecting means 102 detects a fluctuation in vehicle acceleration "a", the guard value adjusting means 142 allows the guard values ΔGmax and ΔGmin, representing values of an upper limit and a lower limit of a range used for the corrected-value limiting means 82 to execute the guard processing of the shift point learning value ΔG, to be set to lower values ΔGmax' and ΔGmin' than those used when no fluctuation of vehicle acceleration "a" is detected. Here, the relationships are expressed as ΔGmax'=ΔGmax×β1 and ΔGmin'=ΔGmin×β2 where β1 and β2 represent coefficients for determining a degree of reduction and are preliminarily defined to be, for instance, β1=β2=0.5.

The acceleration filtering means 144 executes filtering the value of the vehicle acceleration "a", thereby obtaining vehicle acceleration "as" subjected to the filtering. In particular, the filtering is, for instance, a high-speed Fourier transformation (FET) or the like. Under a circumstance where a specified frequency, at which the vehicle vibrates, is limited upon prediction thereof, removing the specified frequency allows vehicle acceleration "as", subjected to the filtering, to be used for reducing the fluctuation in vehicle acceleration "a". Further, "the circumstance where the specified frequency, at which the vehicle vibrates, can be predicted" refers to a case where a prediction is made that a resonant oscillation occurs at a frequency of 10 Hz or the like during the running of the vehicle on, for instance, a wave road.

The first fluctuation detecting means 146 makes a query as to whether all of requirements, listed below, are satisfied to detect if a first fluctuation occurs in vehicle acceleration "a". That is, a first fluctuation detecting condition needs to satisfy all of requirements such as, for instance: (1) the vehicle speed V lying at a specified value or more; (2) no shifting operation being involved; and (3) a deviation Δt (=|a−as|) between actual vehicle acceleration "a" and vehicle acceleration "as", subjected to the filtering, lying at a first given value or more. Once the first fluctuation detecting condition is satisfied, no first fluctuation-detection canceling condition satisfies conditions such as: (4) the vehicle speed V lying at a second specified value or less; or (5) the deviation Δa lying at a second given value or less.

Here, the requirements (1) to (3), forming the first fluctuation detecting condition, represent conditions for detecting if a relatively remarkable fluctuation occurs in vehicle acceleration "a". Among these, the condition (1) is provided for removing the deviation Δa because the deviation Δa increases when the vehicle starts with acceleration. The first specified value is preliminarily obtained on experimental tests or calculated upon simulation so as to satisfy such an object. In addition, the condition (2) is provided for removing the deviation Δa because the deviation Δa increases during the shifting operation. Moreover, the first given value in the condition (3) is a value, preliminarily obtained on experimental tests or calculated upon simulation, for the purpose of determining if the fluctuation occurs in vehicle acceleration "a" when the deviation Δa exceeds the first given value. The first given value is determined in consideration of contents of, for instance, operations executed by the acceleration filtering means 144.

The conditions (4) and (5) of the first fluctuation-detection canceling condition include conditions for determining if an impact of the fluctuation is absent even after the first fluctuation detecting condition is satisfied once. Of these, values of the second specified value of the condition (4) and the second given value of the condition (5) are determined to a have, for instance, a certain hysteresis between the first specified value and the first given value with a view to preventing the first fluctuation detecting means 146 from frequently making determinations in opposite results. The first fluctuation detecting means 146 makes a determination that a relatively increased fluctuation occurs while turning on a first fluctuation determining flag. If the first fluctuation-detection canceling condition is satisfied, the first fluctuation detecting means 146 makes another determination that the fluctuation is absent while turning off the first fluctuation determining flag.

The second fluctuation detecting means 148 makes a query as to whether all of the conditions listed below are satisfied to detect if a second fluctuation occurs in vehicle acceleration "a". That is, a second fluctuation detecting condition needs to satisfy all of requirements such as, for instance: (1) the vehicle speed V lying at a third specified value or more; (2) the shifting operation being absent; and (3) a fluctuation determining counter C (described below) providing a value lying at a third given value or more. Once the second fluctuation detecting condition is satisfied, no second fluctuation-detection canceling condition needs to satisfy conditions such as: (4) the vehicle speed V lying at a fourth specified value or less; or (5) the deviation $\Delta a$ lying at a fourth given value or less.

Here, the requirements (1) to (3), forming the second fluctuation detecting condition, represent conditions for detecting if a fluctuation, lying at a relatively small level to a medium level, occurs in vehicle acceleration "a". Among these, the condition (1) is provided for removing the value of the fluctuation determining counter C, forming the condition (3), because such a value increases when the vehicle starts with acceleration. The third specified value is preliminarily obtained on experimental tests or calculated upon simulation so as to satisfy such an object. In addition, the condition (2) is provided for removing the value of the fluctuation determining counter C because such a value increases during the shifting operation. Moreover, the third given value for the condition (3) is preliminarily obtained on experimental tests or calculated upon simulation for the purpose of determining if the fluctuation occurs in vehicle acceleration "a" when the value of the fluctuation determining counter C exceeds the third given value.

The conditions (4) and (5) for the second fluctuation-detection canceling condition represent conditions for determining if an impact of the fluctuation is absent even when the second fluctuation detecting condition is satisfied once. Of these, values of the fourth specified value for the condition (4) and the fourth given value for the condition (5) are determined to a have, for instance, a certain hysteresis between the third specified value and the third given value with a view to preventing the second fluctuation detecting means 148 from frequently making determinations in opposite results. Further, if the second fluctuation detecting condition is satisfied, then, the second fluctuation detecting means 148 makes a determination that no fluctuation is present while turning off the first fluctuation determining flag that has been turned on once.

The fluctuation determining counter C operates such that the counter, initially reset to, for instance, zero (C=0), repeatedly executes operations for a given time period based on rules described below for thereby obtaining a count value. That is, the rules include conditions under which: (1) when the gear position of the automatic transmission 16 during the running of the vehicle is a gear position lying at a higher speed than that of a specified gear position and current status is immediately after the shifting, the counter is reset (to be C=0); (2) when a current situation satisfies all of conditions under which the vehicle speed V lies at a fifth specified value or more in the absence of the shifting operation and the deviation $\Delta a$ lies at a fifth given value or more, "1" is added to the counter; (3) when the current situation satisfies all of conditions under which the vehicle speed V lies at the fifth specified value or more in the absence of the shifting operation and the deviation $\Delta a$ lies at the fifth given value or less, "1" is subtracted from the counter; and (4) when the current situation remains in other statuses, the count value remains intact in a preceding value.

Here, the rule (1), mentioned above, specifies: that the counter C is based on the premise that the gear position lies at the higher speed gear position than that of the specified gear position corresponding to a target to be preliminarily leant for a shift timing; and that the counter C is reset when the gear position is changed due to the shifting. Further, like the first specified value, the fifth specified value, defined in the rules (2) and (3), is provided to remove the deviation $\Delta a$ because the deviation $\Delta a$ increases when the vehicle takes off with acceleration and preliminarily obtained on experimental tests or calculated on simulation so as to satisfy such an object. Moreover, the deviation $\Delta a$ increases during the shifting and, thus, the absence of the shifting is involved in the rules (2) and (3).

Further, the fifth given value is a value preliminarily obtained on experimental tests or determined on simulation for making a determination if the fluctuation occurs in vehicle acceleration "a" when the deviation $\Delta a$ exceeds the fifth given value. The fifth given value is determined in consideration of the contents of the operations executed by, for instance, the acceleration filtering means 144. That is, the rule (1) compels the counter C to be reset in operation and with the rules (2) to (4), the number of times the fluctuations occurring and the number of times the fluctuations in nonoccurrence are measured for the given time period during which the counter C executes the operation.

Furthermore, the guard processing is initiated so as to prevent the value of the fluctuation determining counter C from taking a negative value and to prevent a delay in satisfying the second fluctuation-detection canceling condition due to an increasing count value in excess. That is, the guard processing is initiated for, for instance, each time the operation is executed to the count value to remain in a value of a predetermined range.

The fluctuation detection determining means 150 makes a query as to whether the fluctuation is detected by referring to a third fluctuation determining flag based on whether the first fluctuation detecting means 146 and the second fluctuation detecting means 148 detect the first and second fluctuations occurring in vehicle acceleration "a". More particularly, the fluctuation detection determining means 150 makes a determination that the fluctuation in vehicle acceleration "a" is detected and turns on the third fluctuation determining flag when, for instance, all of requirements described below satisfied.

That is, a fluctuation determining condition needs to satisfy a requirement in which at least one of the first fluctuation detecting means 146 and the second fluctuation detecting means 148 detect the existence of the fluctuation, i.e., either one of the first and second fluctuation determining flags is turned on. Once the fluctuation determining condition is satisfied, no fluctuation-detection canceling condition needs to satisfy conditions in which none of the first and second fluctuation detecting means 146 and 148 detects the fluctuation, i.e., both of the first and second fluctuation determining flags remain turned off. Once the fluctuation-determination canceling condition is satisfied, a determination is made that no fluctuation is present and the third fluctuation determining flag, once turned on, is turned off.

Figure 11:
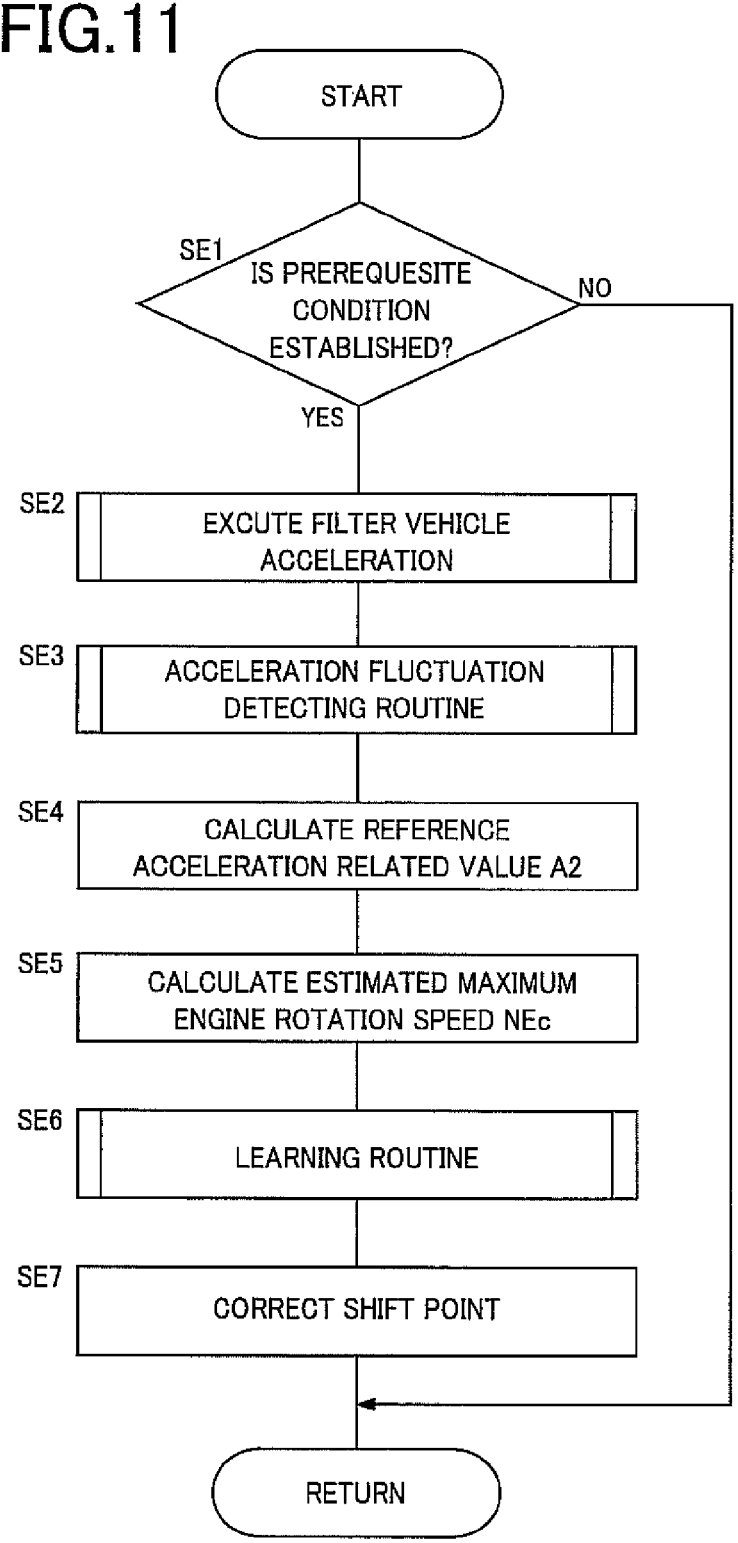
FIG. 11 is flowchart illustrating major control operations to be executed mainly with shift-point correcting means of the electronic control device shown in FIG. 3.

FIG. 11 is a flow chart illustrating one example of the operation of the shift-point correcting means 70 and used for calculating the engine rotation speed NEo corresponding to the corrected shift point representing one example of a corrected value for correcting the shift point used at SC1 of the routine shown, for instance, in FIG. 8.

In FIG. 11, at SE1, a query is made as to whether the executing condition, forming a premise for the current routine to be executed, is established. Examples of the executing condition include various states in which: the throttle opening θth is, for instance, fully opened (at, for instance, 100% or at a value in the vicinity thereto); the oil temperature Toil lies at an automatic-transmission warm-up condition with a temperature exceeding a given value; the engine water temperature Tw lies in an engine warm-up condition with a temperature exceeding a given value; the engine rotation sensor remains in a normal state; and the hydraulically operated frictional engaging device, involved in an upshifting with a fall throttle opening, remains in a normal state, etc. If the answer to SE1 is no, then, even if the shifting is initiated under such a situation, no learning is executed on the shift point at that time and the current flow chart is completed. This is because no shifting is initiated under a normal state with a resultant occurrence of erroneous learning. On the contrary, if the answer to SE1 is yes, then, operations subsequent to succeeding SE2 are executed.

Figure 12:
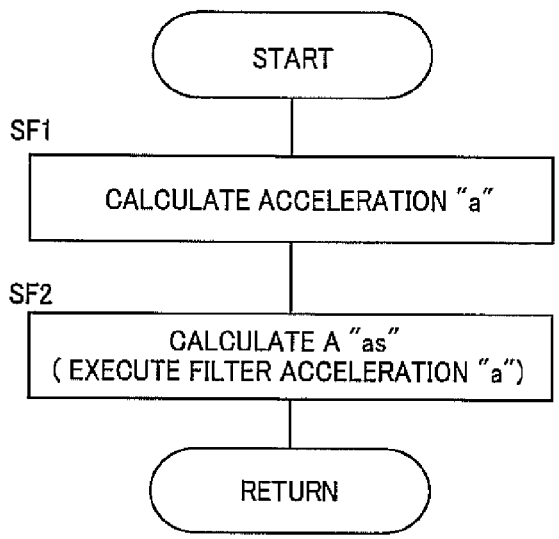
FIG. 12 is a flowchart illustrating filtering routine of a vehicle speed executed at step SE2 in FIG. 6.

Operations at consecutive SE2 and SE3 correspond to the vehicle-acceleration fluctuation detecting means 102. Of these, at SE2 corresponding to the learning gain adjusting means 140, a vehicle-acceleration filtering routine, shown in FIG. 12, is executed. In vehicle-acceleration filtering routine shown in FIG. 12, at SF1, first, vehicle acceleration "a" is calculated. In particular, the vehicle speed V is calculated based on values measured with the rotation speed sensor, mounted on the drive wheels, and the rotation speed sensor mounted on a turbine 14t of a torque converter, upon which vehicle acceleration "a" is calculated by calculating a deviation rate, expressed as dV/dt (=(V(t+Δt)−V(t))/Δt) per minimal unit time of the calculated vehicle speed V.

At succeeding SF2, vehicle acceleration "a", calculated at SF1, is subjected to, for instance, the high-speed Fourier transformation to be filtered, upon which the operation is executed to calculate processed vehicle acceleration "as" with a specified frequency component being removed.

Figure 13:
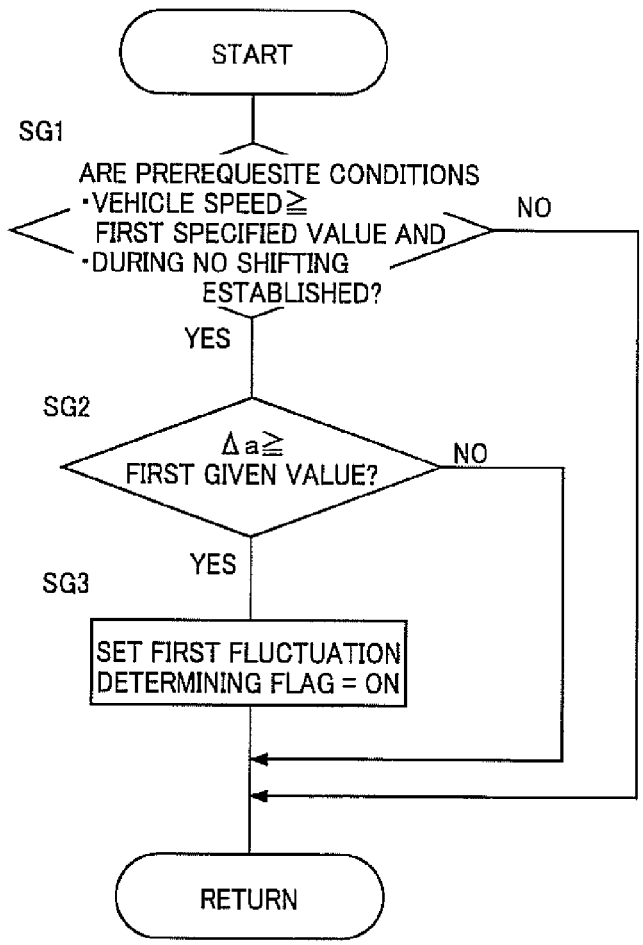
FIG. 13 is a timing chart, illustrating the control operations shown in the flowchart in FIG. 12, which represents an example of a case in which during a halt of a vehicle, rattling gear noise is predicted to exceed a given value after which the engine is started up.
Figure 14:
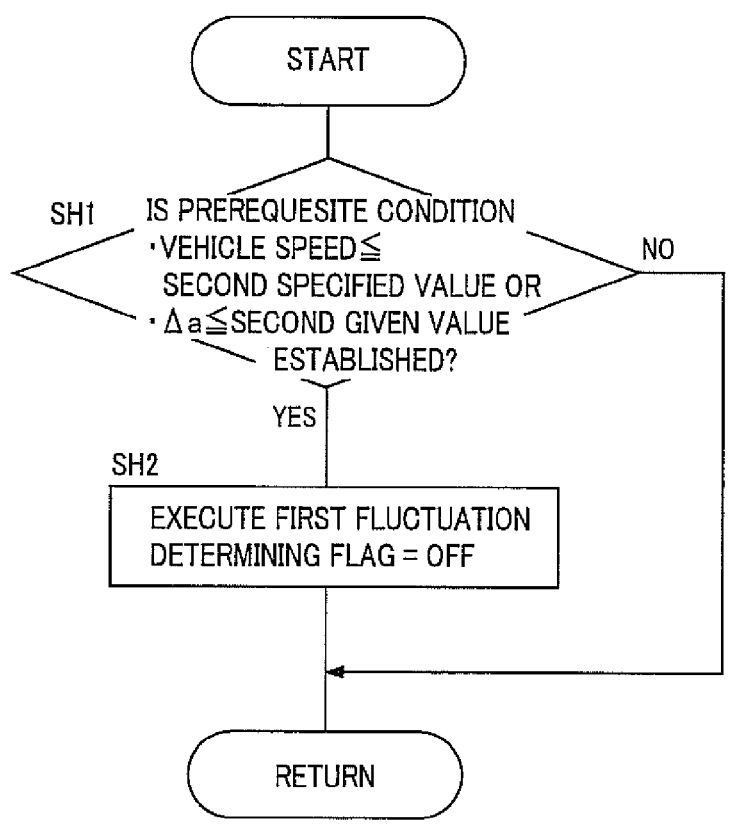
FIG. 14 is a timing chart, illustrating the control operations shown in the flowchart in FIG. 12, which represents an example of another case in which during the halt of the vehicle, a prediction is made that no rattling gear noise exceeds the given value after which the engine is started up.

Turning back to FIG. 11, at SE3 corresponding to the first and second fluctuation detecting means 146 and 148 and the fluctuation detection determining means 150, respective routines, shown in FIGS. 13 to 19, are executed. The routines, shown in FIGS. 13 and 14, correspond to the first fluctuation detecting means 146 and are used for making a query as to whether the routine, shown in FIG. 13, satisfies the first fluctuation detecting condition. Meanwhile, the routine, shown in FIG. 14, is executed after the routine, shown in FIG. 13, has been executed and used for making a query as to whether the first fluctuation-detection canceling condition satisfies.

At SG1 shown in FIG. 13, a query is made as to whether for the premise is present with the vehicle speed V exceeding the first specified value and no current operation being involved in the shifting operation. If the answer to this query is yes, then, the operation at succeeding SG2 is executed. On the contrary, if the answer to this query is no, then, no premise condition is regarded to be satisfied and the current routine is completed without causing the first fluctuation determining flag to be turned on.

At SG2, a query is made as to whether the deviation Δa (=|a−as|) between actual vehicle acceleration "a" and vehicle acceleration "as" subjected to the filtering exceeds the first given value. If the answer to this query is yes, then, the current routine is completed with the first fluctuation determining flag being turned on at SG3. In contrast, if the answer to this query is no, the current routine is completed without causing the first fluctuation determining flag to be turned on.

At SH1 in FIG. 14, a query is made as to whether the first fluctuation-detection canceling condition is satisfied with the vehicle speed V falling in the second specified value or less or the deviation Δa falling in the second given value or less. If the answer to this step is yes, then, at consecutive SH2, the first fluctuation determining flag is turned off. On the contrary, if the answer to this step is no, then, the content of the first fluctuation determining flag is updated and the current routine is completed.

Routines, designated in FIGS. 15 to 17, correspond to the second fluctuation detecting means 148. Among these, the routine shown in FIG. 15 is used for operating the fluctuation determining counter At SI1 in FIG. 15, in executing the current routine, the value of the fluctuation determining counter is reset, i.e., zeroed.

At succeeding SI2, a query is made as to whether the gear position of the automatic transmission 16 is a gear position at a higher vehicle speed than that of the specified gear position and the current operation is immediately after the shifting has been completed. If the answer to this query is yes, then, at consecutive SI3, the fluctuation determining counter C is reset (to be C=0) to cause the counter to newly begins counting for a gear position after the shifting. In contrast, if the answer to the query at SI2 is no, then, operations subsequent to consecutive SI4 are executed with the fluctuation determining counter C keeping a preceding value intact. In addition, the specified gear position is determined on preliminary experimental tests or determined on simulation or the like such that the answer to SI2 is yes for the gear position paced in a running condition causing a fluctuation to occur in a range from small to medium sizes targeted to be detected with the second fluctuation detecting means 148. When processing the fluctuation determining counter for a target on the running of the vehicle at, for instance, the 4th-speed gear position or a gear position higher than the 4th-speed gear position, the specified gear position is determined to be a 3rd-speed gear position.

At SI4, a query is made as to whether all of the requirements are satisfied including the vehicle speed V lying at a fifth specified value and more in the absence of the shifting with the deviation Δa exceeding the fifth given value. If the answer to the query SI4 is yes, then, at consecutive SI5, "1" is added to the value of the fluctuation determining counter C. On the contrary, if the answer to this step is no, then, operations subsequent to consecutive SI4 are executed with the value of the fluctuation determining counter C being kept intact.

At SI6, a query is made as to whether all of the requirements are satisfied including the vehicle speed V lying at the fifth specified value and no shifting being involved with the deviation Δa being less than the fifth given value. If the answer to the query SI6 is yes, then, at consecutive SI7, "1" is subtracted from the value of the fluctuation determining counter C. On the contrary, if the answer to this step is no, then, operations subsequent to consecutive SI9 are executed with the preceding value of the fluctuation determining counter C being kept intact at SI8.

At SI9, a query is made as to whether the resulting value of the fluctuation determining counter C, appearing as a result of executing SI1 to SI8, satisfies the relationship expressed as $Cmin \leq C \leq Cmax$. If the answer to this query is yes, then, SI11 is executed as a result of the value of the fluctuation determining counter C. In contrast, if the answer to the query at SI9 is no, then, at succeeding SI10, the so-called guard processing is executed to establish the relationships: C=Cmax when the fluctuation determining counter C has a value expressed as C>Cmax; and C=Cmin if C<Cmin. Of these guard processing, for the lower limit, the guard value Cmin, lying at a so-called lower limit, is set to be, for instance, Cmin=0 such that the fluctuation determining counter C takes no negative value.

Further, the upper limit is determined to avoid the value of the fluctuation determining counter C from increasing in excess when the second fluctuation detecting means 148 makes a query as to whether the second fluctuation-detection canceling condition is satisfied. In particular, the expression "when the second fluctuation detecting means 148 makes a query" corresponds to SK1 in a flow chart shown in FIG. 17 that will be described below. If the value of the fluctuation determining counter C increases in excess, an issue arises with the occurrence in that it takes longer time for satisfying the second fluctuation-detection canceling condition.

Consequently, the guard value Cmax for the upper limit is determined based on a maximal time interval on design since the second fluctuation-detection canceling condition is satisfied to allow the learning and corrected-value adjusting means 100 to begin adjusting the learning and corrected value and up to timing at which the second fluctuation-detection canceling condition is satisfied to allow the learning and corrected-value adjusting means 100 to terminate the adjusting on the learning and correction. More particularly, the time interval is designed to have a maximum value of, for instance, 2000 ms since the second fluctuation-detection canceling condition is satisfied to allow the learning and corrected-value adjusting means 100 to begin adjusting the learning and corrected value and up to timing at which the second fluctuation-detection canceling condition is satisfied to allow the learning and corrected-value adjusting means 100 to terminate the adjusting on the learning and correction. When executing the routine, shown in FIG. 15 for a cycle of 10 ms, the relationship is determined as Cmax=200.

At SI11, a query is made as to whether a given time has elapsed from the beginning of the current routine being executed. If the answer to this query is yes, i.e., when the current routine is executed only for the given time interval, then, the current routine is completed. On the contrary, if the answer to the current step is no, i.e., when no current routine is executed for the given time interval, the operation is routed back to SI2 to allow the operations at SI2 to SI10 to be repeatedly executed until the given time interval elapses, i.e., until the answer to the current step becomes yes. In addition, a value of the given time interval is preliminarily obtained on experimental tests or calculated on simulation and set to an adequate time for the second fluctuation detecting means 148 to detect the fluctuation in acceleration.

FIGS. 16 and 17 show routines corresponding to the second fluctuation detecting means 148 to be used for making a query as to whether the second fluctuation-detection canceling condition is satisfied. Meanwhile, the routine shown in FIG. 17 is executed after, for instance, the routine shown in FIG. 16 has been executed and used for making a query as to whether the second fluctuation-detection canceling condition is satisfied.

In FIG. 16, at SJ1, a query is made as to whether the prerequisite conditions are satisfied, i.e., the vehicle speed V lies at the third specified value or more and no shifting is involved. If the answer to this query is yes, then, succeeding SJ2 is executed. In contrast, if the answer to this query is no, then, a determination is made that no prerequisite condition is satisfied and the current routine is completed without causing the second fluctuation-detection canceling condition to be turned on.

At SJ2, a query is made as to whether the value of the fluctuation determining counter C, counted in the routine shown in FIG. 15, reaches the third given value or more. If the answer to this query is yes, then, a determination is made that the second fluctuation-detection canceling condition is satisfied and the current routine is completed while causing the second fluctuation determining flag to be turned on at SJ3. On the contrary, if the answer to this query is no, then, the current routine is completed without causing the second fluctuation determining flag to be turned on.

At SK1 in FIG. 17, a query is made as to whether the second fluctuation-detection canceling condition is satisfied including the vehicle speed V lying at the fourth specified value or less or the value of the fluctuation determining counter C lying at the fourth given value or less. If the answer to this query is yes, then, at succeeding SK2, the second fluctuation determining flag is turned off. On the contrary, if the answer to this query is no, then, the current routine is completed without updating the content of the second fluctuation determining flag.

Figure 19:
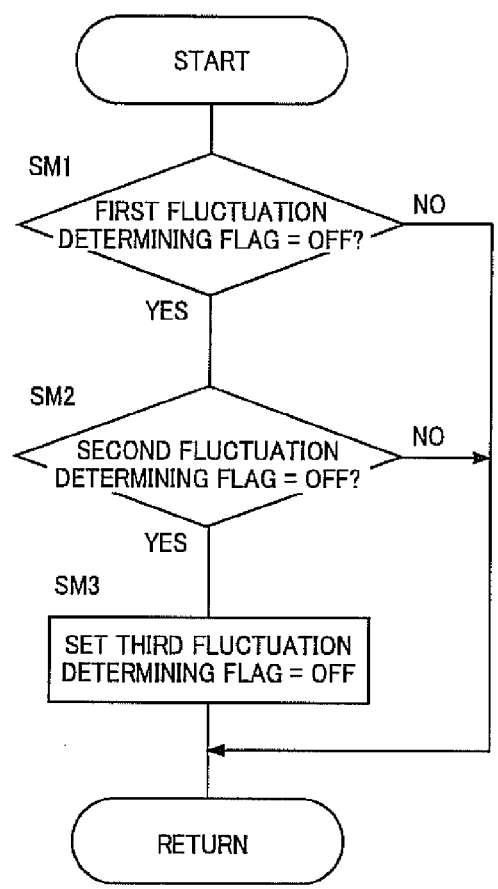
FIG. 19 is a flowchart, illustrating the acceleration-fluctuation detecting routine executed at step SE3 in FIG. 11, which corresponds to the fluctuation-detection determining means.

FIGS. 18 and 19 shows routines corresponding to the fluctuation detection determining means 150 to be used for making a query as to whether the routine, shown in FIG. 18, satisfies the fluctuation-detection determining condition. Meanwhile, the routine, shown in FIG. 17, is executed after, for instance, the routine shown in FIG. 16 has been executed and used for making a query as to whether the fluctuation-determination canceling condition is satisfied.

At SL1 in FIG. 18, a query is made as to whether the content of the first fluctuation determining flag, determined with the routines shown in FIGS. 13 and 14, is turned on. If the answer to this query is yes, i.e., when the first fluctuation determining flag is turned on, then, SL3 is executed. On the contrary, if the answer to this query is no, i.e., when the first fluctuation determining flag is turned off, then, succeeding SL2 is executed.

At SL2, a query is made as to whether the content of the second fluctuation determining flag, determined with the routines shown in FIGS. 16 and 17, is turned on. If the answer to this query is yes, i.e., when the second fluctuation determining flag is turned on, then, SL3 is executed. On the contrary, if the answer to this query at SL2 is no, i.e., when the second fluctuation determining flag is turned off, then, SL4 is executed.

At SL3, the third fluctuation determining flag is turned on. Meanwhile, at SL4, the third fluctuation determining flag is turned off. That is, in the routine shown in FIG. 18, if at least one of the first and second fluctuation determining flags is turned on, then, the third fluctuation determining flag is turned on. On the contrary, if both the first and second fluctuation determining flags are turned off, then, the third fluctuation determining flag is turned off.

At SM1 in FIG. 19, meanwhile, a query is made as to whether the first fluctuation determining flag is turned off. If the answer to this query is yes, i.e., when the first fluctuation determining flag is turned off, then, the operation at succeeding SM2 is executed. On the contrary, if the answer to the query at SM1 is no, i.e., when the first fluctuation determining flag is turned on, then, the current routine is completed with the third fluctuation determining flag kept intact in a preceding value.

At SM2, a query is made as to whether the second fluctuation determining flag is turned off. If the answer to this query is yes, i.e., when the second fluctuation determining flag is turned off, the operation at succeeding SM3 is executed. On the contrary, if the answer to the query at SM2 is no, i.e., when the second fluctuation determining flag is turned on, then, the current routine is completed with the third fluctuation determining flag kept intact in the preceding value.

At SM3, the third fluctuation determining flag is turned off. That is, in the routine shown in FIG. 19, the third fluctuation determining flag is turned off only when both the first and second fluctuation determining flags are turned off. On the contrary, if at least one of the first and second fluctuation determining flags is turned on, then, the operation is executed to keep the preceding value. Upon determining the value of the third fluctuation determining flag, a series of routines, shown in FIGS. 13 to 19, are completed in operation.

Turning back to FIG. 11, at SE4 corresponding to the reference engine-rotation acceleration calculating means 74, reference engine-rotation acceleration A2 is calculated. That is, at SE4, reference engine-rotation acceleration A2 is calculated based on at least one of the running state of the vehicle at the shift output, i.e., for instance, the vehicle speed V, the throttle opening θth and input torque of the automatic transmission 16 by referring to the relationship preliminarily obtained on experimental tests and stored.

At SE5 corresponding to the estimated maximum engine-rotation-speed calculating means 72, the operation is executed to estimate a value of the estimated maximum engine rotation speed NEc. That is, the engine-rotation acceleration calculating means 76 sequentially calculates engine-rotation acceleration based on reference engine-rotation acceleration A2 calculated at SE4, the rotation speed NE1 of the engine 12 at the shift output detected with the engine-rotation acceleration sensor 46, the rotation speed NE2 of the engine 12 at the inertia-phase start and the detected engine rotation speed NE. At SE5, of engine-rotation acceleration, engine-rotation acceleration A1 appearing at the shift output is applied to the formula (1) described above, thereby estimating the value of the estimated maximum engine rotation speed NEc. In addition, as set forth above, the fluctuation (noise) usually increases in the engine rotation speed NE and, hence, use is made of the engine rotation speed NE subjected to smoothing filtering treatment such as a moving average or the like.

Figure 20:
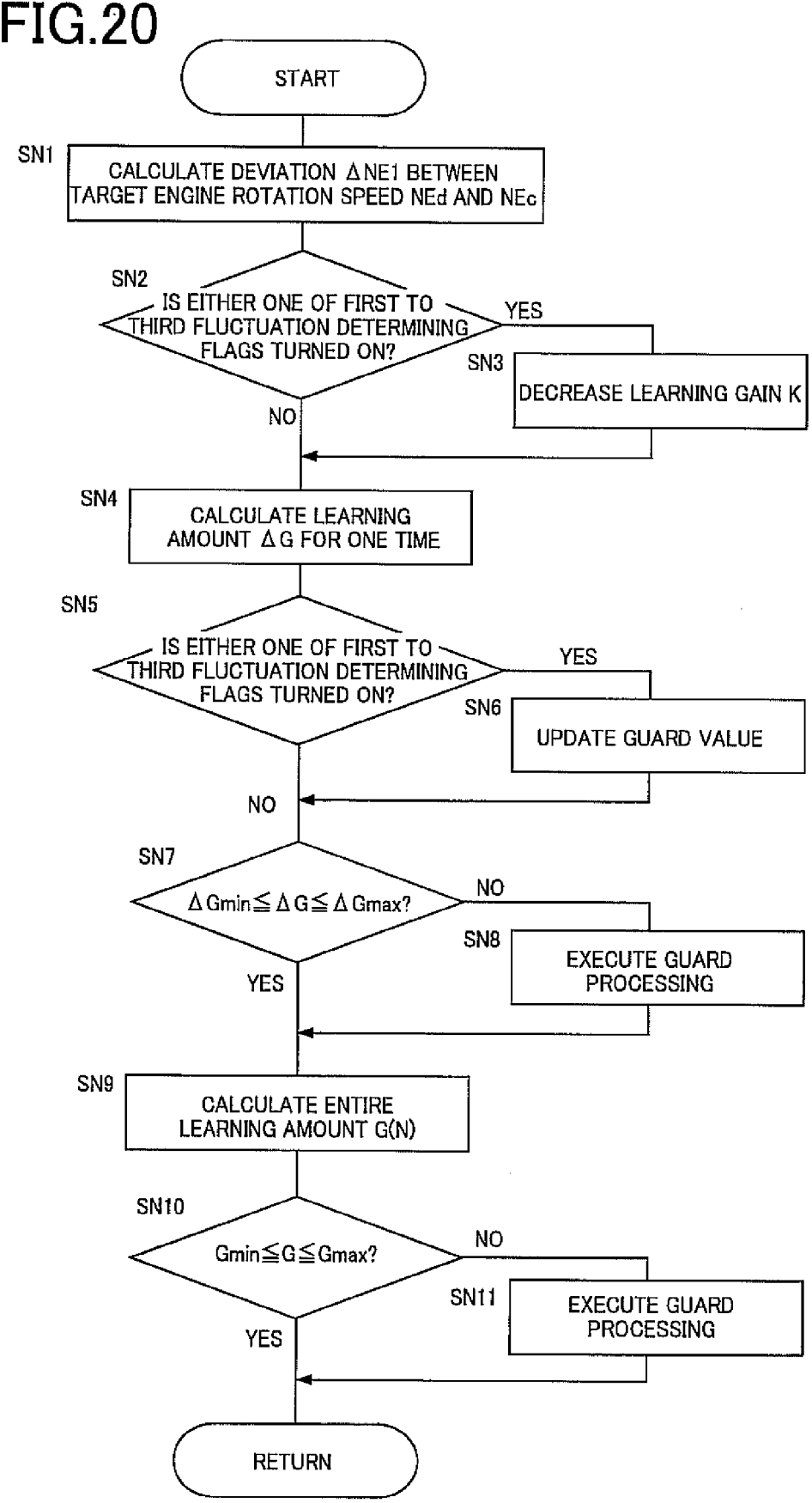
FIG. 20 is a flowchart, illustrating learning routine executed at step SE6 in FIG. 11. which corresponds to the second fluctuation detecting means.

Consecutive SE6 corresponds to the learning and corrected-value calculating means 80. At SE6, the learning routine, shown in FIG. 20, is executed. In FIG. 20, at SN1, the operation is executed to calculate a deviation $\Delta NE1$ between the estimated maximum engine rotation speed NEc, estimated at SE5, and a preset target maximum engine rotation speed NEd.

SN2 and SN3 correspond to the learning gain adjusting means 140. First, at SN2, a query is made as to whether at least one of the first to third fluctuation determining flags is turned on upon which a further query is made as to as to whether the vehicle-acceleration fluctuation detecting means 102 has detected the fluctuation in vehicle acceleration "a". If the answer to this query is yes, i.e., when at least either one of the first to third fluctuation determining flags is turned on, then, at succeeding SN3, a value of the learning gain K, used in the learning and corrected-value calculating means 80, is updated to a value K' smaller than that of the learning gain in which no fluctuation in engine-rotation acceleration is detected. If the answer to the query at SN2 is no, i.e., when all of the first to third fluctuation determining flags are turned off, then, no operation is executed at SN3 and the operation at SN4 is executed.

At consecutive SN4, the shift point learning amount $\Delta G$ for one time is determined based on the deviation $\Delta NE1$ calculated at SN1. Here, $\Delta G$ is obtained by referring to the relationship expressed as $\Delta G = K \times \Delta NE1$. K represents a learning and correction coefficient (learning gain) for determining the weight of the learning and is preliminarily given. Moreover, when SN3 is executed, K', calculated at SN3, is used in place of the learning gain K.

SN5 and SN6 correspond to the guard value adjusting means 142. First at SN5, like the operation at SN2, a query is made as to whether either one of the first to third fluctuation determining flags is turned on. This allows a query to be made as to whether the vehicle-acceleration fluctuation detecting means 102 has detected the fluctuation in vehicle acceleration "a". If the answer to this query is yes, i.e., when at least one of the first to third fluctuation determining flags is turned on, then, at succeeding SN6, values of the so-called guard values $\Delta Gmax$ and $\Delta Gmin$, used in the corrected-value limiting means 82, are updated to values of $\Delta Gmax'$ and $\Delta Gmin'$ lower than those of the guard values appearing when the fluctuation in engine-rotation acceleration is detected. On the contrary, if the answer to the query at SN5 is no, i.e., when all of the first to third fluctuation determining flags are turned off, then, then, no operation is executed at SN6 and an operation at SB7 is executed.

Succeeding SN7 and SN8 correspond to the corrected-value limiting means 82. First at SN7, a query is made as to whether the learning amount $\Delta G$ for one time, determined at SN4, exceeds a predetermined range ($\Delta Gmin \leq \Delta G \leq \Delta Gmax$). If the learning amount does not exceed such a range, an operation at SN8 is executed to limit a value of $\Delta G$. If the answer to the query at SN7 is yes, then, a determined amount $\Delta G$ is used intact to be $\Delta G' = \Delta G$ for the learning and the operation is routed to SN10. At SN8, if $\Delta G$ exceeds the upper limit $\Delta Gmax$ of the range described above, then, the relationship is regarded to be $\Delta G = \Delta Gmax$. If $\Delta G$ falls below the lower limit $\Delta Gmin$, then, the guard processing is executed with $\Delta G = \Delta Gmin$. In addition, when the operation is executed at SN6, the values of $\Delta Gmax$ and $\Delta Gmin$ are replaced in use by the guard values of $Gmax'$ and $\Delta Gmin'$ calculated at SN6, respectively.

At SN9, $\Delta G'$, calculated in such a way, is added to a total learning amount G (N−1) summed up to a preceding shifting to obtain a total learning amount G (N) to which a value of the learning, acquired at a current shifting, is added. That is, the total learning amount G (N), subsequent to the current learning, is expressed as G (N)=G (N−1)+$\Delta G'$.

Succeeding SN10 and SN11 correspond to the corrected-value limiting means 82. That is, at SN10, a query is made as to whether the resulting total learning amount G (N) exceeds a predetermined range (Gmin$\leq$G (N)$\leq$Gmax). If the answer to the query at SN10 is no, i.e., when the total learning amount does not exceed such a range, the routine proceeds to SN11. In contrast, if the answer to the query at SN10 is yes, then, the current routine is completed with the learning result incorporating the total learning amount G (N) calculated at SN10. At SN11, the so-called guard processing is executed. That is, if G (N) exceeds the upper limit Gmax of the range mentioned above, then, the total learning amount is set to G (N)=Gmax. In contrast, if G (N) falls below the lower limit Gmin of the range mentioned above, then, the total learning amount is set to G (N)=Gmin. As a learning result of G (N) subsequent to the respective processing, the current routine is completed.

Turning back to FIG. 11, at SE7 corresponding to the shift-point correcting means 70, the shifting diagram, stored in the shifting-diagram storing means 52, is corrected based on the total teaming amount G (N) subjected to the learning obtained with the ending of the learning routine at SE6 (see FIG. 11), upon which the current routine is completed.

Figure 21:
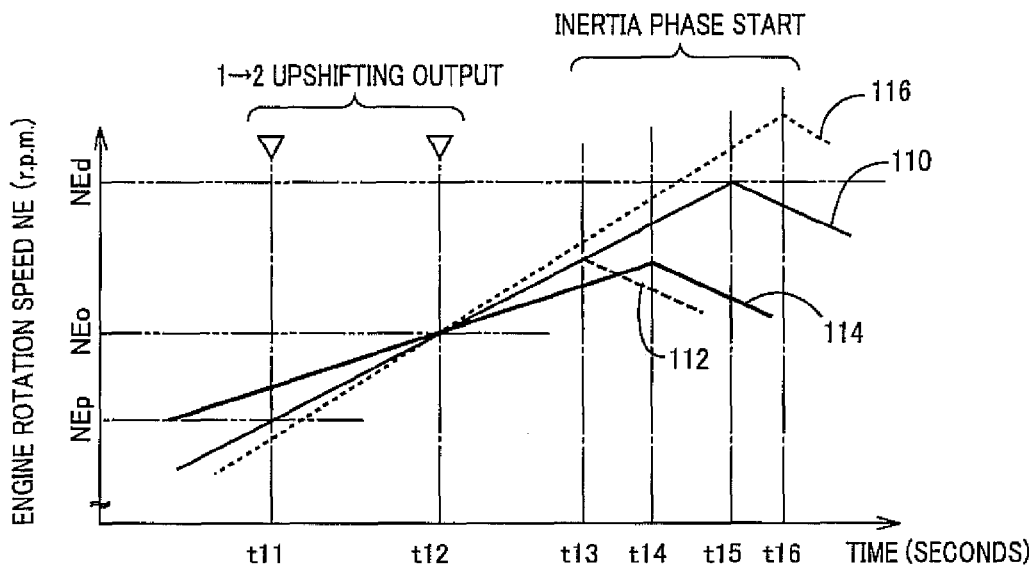
FIG. 21 is a timing chart, illustrating the major control operations executed with the electronic control device shown in FIG. 3, which represents a case under which the embodiment of the present invention is not applied.

FIGS. 21 and 22 are views showing variations in engine rotation speed NE in terms of time during a full-throttle upshifting (1→2) operation from a 1st-speed gear position to a 2nd-speed gear position. FIG. 21 represents a case to which no embodiment of the present invention is applied and FIG. 22 represents another case to which the embodiment of the present invention is applied.

First, description will be made with reference to FIG. 21. In the related art, if the shift-point correcting means 70 executes no learning and correction of the shift point depending on piece-to-piece variations of automatic transmissions, the engine rotation speed at the shift point is determined to be NEp. When a vehicle is running at engine-rotation acceleration with a gradient varying as shown by a solid line 110 in FIG. 21, the engine rotation speed NE exceeds a value of NEp at time t11 to begin initiating the upshifting output. Then, at time t13, an inertia phase is commenced and the engine rotation speed is lowered (see a broken line 112). When this takes place, no engine rotation speed NE reaches a target maximal engine rotation speed NEd and no engine performance is adequately maxed out.

The shift-point correcting means 70 executes the learning of such a shifting to allow the shift point to be corrected such that the engine rotation speed NE lies at NEo. As a result, with the vehicle running at engine-rotation acceleration with the gradient indicated by the solid line 110, the engine rotation speed NE exceeds the value of NEo at time t12 to begin initiating the upshifting output. At time t15, the inertia phase is commenced and the engine rotation speed appearing at that time has a peak that approaches the target maximal engine rotation speed NEd, whereby engine performance can be sufficiently maxed out within a range of the engine rotation speed.

However, the operation of the shift-point correcting means 70 to correct such a shift point is executed depending on the piece-to-piece variations of the automatic transmissions but not depending on acceleration of the vehicle. Accordingly, when the full-throttle upshifting is initiated during acceleration different from acceleration at the learning operation, it is likely that during a variation in engine rotation speed NE for a period up to the beginning of the inertia phase, the engine rotation speed NE tends to exceed the target maximal engine rotation speed NEd. The situation under which the full-throttle upshifting is performed includes a case under which the vehicle runs at high acceleration with a gradient indicated on a broken line 116 in FIG. 21. In contrast, when the vehicle runs at low acceleration with a gradient indicated on a thick solid line 114 in FIG. 21, it is likely that the inertia phase begins with no engine rotation speed NE reaching the target maximal engine rotation speed NEd.

Meanwhile, with the case shown in FIG. 22 to which the present embodiment according to the present is applied, at t20 when the upshift determination is made, engine-rotation acceleration A and engine-rotation acceleration A2 are calculated and, also, the acceleration correcting coefficient γ for a ratio of these accelerations is calculated. The shift-point correcting means 70 executes the learning and correction based on the calculated acceleration correcting coefficient γ, thereby modifying the shift point, subjected to the correction, which is stored in the shifting-diagram storing means 52. As a result, even if a variation occurs in acceleration during the execution of the shifting, the variation in the engine rotation speed NE during a period from the shifting output to the beginning of the inertia phase is compelled to approach the target maximal engine rotation speed NEd.

That is, under a situation where engine-rotation acceleration A2 with the acceleration correcting coefficient of γ=1, i.e., at the upshift-determining timing t20 as indicated by a solid line 118 in FIG. 22, is equal to engine-rotation acceleration A, no shift point is modified from a shift point corresponding to the engine rotation speed NEo learnt and modified with the shift-point correcting means 70. Accordingly, at time t22, the engine rotation speed NE exceeds the value of NEo to allow the shifting output to be commenced and, before the inertia phase is commenced at time t24, the engine rotation speed NE approaches the target maximal engine rotation speed NEd.

Further, if an acceleration correcting coefficient γ>1, i.e., if engine-rotation acceleration A2, appearing at the upshifting determining time t20 as indicated by a broken line 122, lies at higher acceleration than reference engine-rotation acceleration A, the shift point is modified in a manner described below. That is, the engine rotation speed, learnt and corrected with the shift-point correcting means 70, is modified from a shift point corresponding to NEo to allow the engine rotation speed to be modified to another shift point corresponding to NEn'2. As a result, at time t21, the shifting output is initiated at the engine rotation speed NE exceeding NEn'2 and, thereafter, the engine rotation speed NE is caused to approach the target maximal engine rotation speed NEd before the inertia phase is commenced at time t24.

Meanwhile, if an acceleration correcting coefficient γ<1, i.e., if engine-rotation acceleration A2, appearing at the upshifting determining time t20 as indicated by a thick line 120, lies at lower acceleration than reference engine-rotation acceleration A, the shift point is modified in a manner described below. That is, the engine rotation speed, learnt and corrected with the shift-point correcting means 70, is corrected from the shift point corresponding to NEo to allow the engine rotation speed to be modified to another shift point corresponding to NEn'1. As a result, at time t23, the shifting output is initiated at the engine rotation speed NE exceeding NEn'1 and, thereafter, the engine rotation speed NE is caused to approach the target maximal engine rotation speed NEd before the inertia phase is commenced at time t24, In FIG. 22, further, the upshifting determining time t20 is determined in consideration of a probability in which due to the modification of the shift point, the shifting output initiating time becomes faster than that of the running time (t22) lying at reference acceleration A2. Under a circumstance where there is a probability for the shift timing to be made faster from the shift timing t22, at which the vehicle is running at reference acceleration A2, to, for instance, t21 by a maximum vale due to the shift point being modified, the upshifting determining time may be determined to lie at a time made faster at least from time t21 by a time interval required for executing the shift determination and related measurement and operation for calculation.

In this moment, in modifying the shift point, the guard processing is conducted on the engine rotation speed corresponding to the shift point to be modified, upon which the lower limit NEnmin is determined. Accordingly, it becomes possible to calculate a time for a case in which the shifting output initiating time is made mostly faster depending on the engine rotation speed and acceleration of the vehicle that can be supposed.

With the present embodiment described above, as set forth above, the shift point real-time modifying means 60 modifies the shift point, updated by the shift-point correcting means 70 so as to allow the maximum value of the engine rotation speed NE, rising even after the shifting output for a given time interval, to approach the target maximal engine rotation speed NEd, in a manner described below. That is, the engine-rotation acceleration calculating means (76: SA3) calculates a value A of actual engine-rotation acceleration at the upshifting determining time during the power-on running operation.

The reference engine-rotation acceleration calculating means (74: SA3) calculates reference engine-rotation acceleration A2 obtained by substituting a value of actual engine-rotation acceleration to a value for a reference running state having no impact on acceleration of the vehicle. The acceleration-correcting coefficient calculating means (90: SA4) calculates the acceleration correcting coefficient γ representing a ratio of these factors. The aft-modified engine rotation speed calculating means (92: SA5) calculates the engine rotation speed corresponding to the modified shift point based on the acceleration correcting coefficient γ and the target maximal engine rotation speed NEd. The shift-point modification executing means (94: SA7) modifies the shift point on a real time basis.

Accordingly, a shift command can be initiated at timing in consideration of actual engine-rotation acceleration, Thus, even if rotation acceleration A of a prime mover is different from reference engine-rotation acceleration A2, the engine rotation speed NE can be caused to approach the target maximal engine rotation speed NEd. A situation under which rotation acceleration A of the prime mover is different from reference engine-rotation acceleration A2 includes a running condition of the vehicle such as toeing or hill-climbing state having an impact on acceleration of the vehicle.

With the present embodiment described above, further, the shift point real-time modifying means 60 allows the reference engine-rotation acceleration calculating means (74: SA3) to calculate reference engine-rotation acceleration A2 substituting the value A of engine-rotation acceleration appearing at the upshift-determining timing during the power-on running state of the vehicle to the value for the reference running state having no impact on acceleration of the vehicle. This allows the corrected value to be further modified based on a value of the ratio between reference engine-rotation acceleration A2 and engine-rotation acceleration at the upshift-determining timing. Accordingly, the shift point can be modified depending on the magnitude of acceleration even in the presence of a case where acceleration of the vehicle is different from that of a normal state like a phase of toeing or hill-climbing.

With the present embodiment described above, furthermore, during a WOT (Wide Open Throttle: Fully Opened) shifting needed especially for the maximum engine rotation speed NE to follow the target maximal engine rotation speed NEd, the engine rotation speed NE can follow the target maximal engine rotation speed NEd with increased precision. This suppresses the occurrences of a phenomenon of the upshifting executed with no engine rotation speed NE reaching the target maximal engine rotation speed NEd and a phenomenon of the upshifting initiated with the engine rotation speed NE continued intact in a state exceeding an allowable maximal engine rotation speed. Thus, it becomes possible to minimize uncomfortable feeling on a user caused by the decrease described above.

With the present embodiment described above, moreover, the shift-point correcting means (70: SC1) estimates the estimated maximum engine rotation speed substituting the maximum value of the engine rotation speed NE appearing after the upshifting output initiated during the power-on running state to the value for the reference running state having no impact on acceleration of the vehicle. Thereafter, the shift point real-time modifying means 60 modifies a modified value on a real time basis for the shift point corrected based on the corrected value calculated on the ground of the deviation between the estimated maximum engine rotation speed and the target maximum engine rotation speed NEd. Consequently, it becomes possible to correct not only the shift point depending on the piece-to-piece variations of the automatic transmissions but also to modify the shift point depending on a variation in acceleration A of the vehicle.

With the present embodiment described above, besides, the shift-point correcting means (70: SC1) adjusts the corrected value based on the magnitude of fluctuation in vehicle acceleration "a" detected with the vehicle-acceleration fluctuation detecting means (102: SE3). Accordingly, even if the fluctuation occurs in vehicle acceleration "a", the shift-point correcting means can continuously execute the learning of the shift point and minimize an adverse affect arising from erroneous learning without interrupting the correction of the shift point.

With the present embodiment described above, further, the shift-point correcting means (70: SC1) adjusts the corrected value such that the greater the fluctuation in vehicle acceleration "a" detected with vehicle-acceleration fluctuation detecting means (102: SE3), the smaller will be the corrected value in contrast to a case in the absence of fluctuation in vehicle acceleration "a" (SN2 and SN3 and SN5 and SN6). Therefore, even if the learning and the correction of the shift point is continued under a situation where the fluctuation occurs in vehicle acceleration like a case with the vehicle running on a punishing road, the adjustment is made so as to limit the corrected value. This suppresses the shift point from being corrected with the shifting executed on an adverse affect caused by erroneous learning, i.e., at erroneous timing.

With the present embodiment described above, furthermore, the aft-modified engine rotation speed calculating means (92: SA5) calculates the aft-modified engine rotation speed NEn representing the engine rotation speed of the shift point after the modification conducted in a manner described below. That is, the aft-modified engine rotation speed NEn is calculated by referring to a preliminarily stored relationship based on a deviation ΔNE2 between the acceleration correcting coefficient γ representing a value of a ratio between actual engine-rotation acceleration at the upshift-determining timing and reference engine-rotation acceleration, and the aft-corrected engine rotation speed NEo representing the engine rotation speed at the shift point corrected based on the target maximum engine rotation speed NEd and the corrected value.

With the present embodiment described above, moreover, the aft-modified engine rotation speed calculating means (92: SA5) preliminarily stores a formula for calculating the aft-modified engine rotation speed NEn based on the acceleration correcting coefficient γ and the deviation ΔNE2 between the target maximum engine rotation speed NEd and the aft-corrected engine rotation speed NEo. The aft-modified engine rotation speed NEn can be sequentially calculated by referring to the relational formula. Accordingly, the operation can be executed to accurately calculate the value on a case-by-case basis.

With the present embodiment described above, besides, the modified value limiting means (96: SC3 to SC5), contained in the aft-modified engine rotation speed calculating means 92, allows the aft-modified engine rotation speed NEn, calculated with the aft-modified engine rotation speed calculating means 92, to be limited between an upper limit and a lower limit that are preset. Accordingly, no shift point is modified in excess, enabling the prevention of the shifting due to erroneous determination.

With the present embodiment described above, further, the aft-modified engine rotation speed calculating means (92: SA5) determines the aft-modified engine rotation speed NEn based on the working oil temperature Toil of the automatic transmission. This prevents the occurrence of a variation in shifting time resulting from working oil viscosity different for each working oil temperature Toil.

With the present embodiment described above, furthermore, if the shift point matches a predetermined shift-point modification interrupting condition, the modification-execution interrupting means (98: SA2) inhibits the shift point real-time modifying means 60 from modifying the shift point. Therefore, if the shift point matches the shift-point modification interrupting condition, no shift point is modified.

FIG. 23 is a diagram showing an example different from that of FIG. 2 for illustrating gear positions and speed ratios to be attained in the automatic transmission 16 shown in FIG. 1. With the present embodiment described above, the first planetary gear set 22 provides a gear ratio $\rho 1$ of "0.435"; the second planetary gear set 26 provides a gear ratio $\rho 2$ of "0.391"; and the third planetary gear set 28 provides a gear ratio $\rho 3$ of "0.600". The present embodiment has an advantage of obtaining an appropriate speed ratio characteristic as a whole in that a total speed ratio range (=3.300/0.609) takes a value as high as about "5.4" and a reverse drive gear position has a speed ratio lying at an appropriate value of "4.148".

While the present invention has been described above in detail with reference to one embodiment shown in the drawings, the present invention may be implemented in other modes.

With the present embodiment described above set forth above, "the reference running state" has been assigned to be the flat road running state in the presence of a predetermined reference number of vehicle occupants. However, the present invention is not limited to such a running state and may include another running state except for such a running state provided that the running state, involved under a running state with a given load capacity, is present with no impact on acceleration of the vehicle.

While the present embodiment mentioned above has been applied to a case where the shifting is initiated under the throttle opening θth remaining at a full opening state or a nearly full opening state. However, the present invention is not limited to such a shifting and can be applied to a case where a shifting state is present at a throttle opening lower than the full open state of the throttle opening θth.

With the present embodiment described above, further, the modification, executed by the shift point real-time modifying means 60 has been targeted on the shift point subsequent to the learning and correction executed by the shift-point correcting means 70. However, the present invention is not limited to such an embodiment and the correction may be made on a shift point preliminarily stored in the shifting-diagram storing means 52 with no learning being executed. That is, in this case, no shift-point correcting means 70 is necessarily needed and the shift point, read out at SC1, may be, for instance, a shift point preliminarily stored in the shifting-diagram storing means 52.

With the present embodiment described above set forth above, furthermore, the aft-modified engine rotation speed calculating means 92 has been described as having a function to calculate the aft-modified engine rotation speed NEn upon applying the value of the acceleration correcting coefficient γ and the value of the deviation ΔNE2 between the target maximum engine rotation speed NEd and the aft-corrected engine rotation speed NEo to the formula that is preliminarily stored. However, the present invention is not limited to such an operation and such a calculation may be made by referring to a table or the like that enables a calculation based on the value of the acceleration correcting coefficient γ and the value of the deviation ΔNE2 between the target maximum engine rotation speed NEd and the aft-corrected engine rotation speed NEo. With the present embodiment described above, moreover, the aft-corrected engine rotation speed NEn can be obtained by referring to the table based on the value of the acceleration correcting coefficient γ and the value of the deviation ΔNE2 between the target maximum engine rotation speed NEd and the aft-corrected engine rotation speed NEo. Thus, no need arises to execute the operations on a case-by-case basis and no time is required for achieving such calculations.

With the present embodiment described above, moreover, the deviation ΔNE2 has been referred to the deviation between the target maximum engine rotation speed NEd and the aft-corrected engine rotation speed NEo at the corrected shift point. However, the present invention is not limited to such a deviation and such a deviation may refer to a deviation between, for instance, the target maximum engine rotation speed NEd and a fore-correction engine rotation speed representing an engine rotation speed at a shift point before the correction is executed.

With the present embodiment described above, further, the aft-modified engine rotation speed calculating means 92 includes the modified value limiting means 96 arranged to execute the guard processing on the aft-modified engine rotation speed NEn calculated by the aft-modified engine rotation speed calculating means 92. However, the present invention is not limited to such an arrangement and the value of the aft-modified engine rotation speed NEn may be limited by another method except for the guard processing. In another alternative, a value, calculated with the aft-modified engine rotation speed calculating means 92, may be used intact with the shift-point modification executing means 94. In particular, if there is no likelihood of a particular limitation in the value of the aft-modified engine rotation speed NEn, no modified value limiting means 96 (SC3 to SC5) is needed. Likewise, further, although the acceleration-correcting coefficient calculating means 90 has been described with reference to an effect of executing the guard processing (SB4 and SB5) on the acceleration correcting coefficient γ, another method may be adopted to limit the value of the acceleration correcting coefficient γ or no attempt may be made to limit such a value.

With the present embodiment described above, furthermore, the aft-modified engine rotation speed calculating means 92, including the AT oil temperature reflecting means 97, calculates the aft-modified engine rotation speed NEn. The AT oil temperature reflecting means 97 multiplies the aft-modified engine rotation speed NEn by the correcting coefficient μ varying depending on the oil temperature Toil of working oil filled in the automatic transmission 16 at the shift determining timing, thereby giving the value NEn'. Using NEn' based in consideration of the oil temperature of working oil in the automatic transmission 16, the shift-point modification executing means 94 modifies the shift point. However, the present embodiment is not necessarily limited to such an arrangement and the shift-point modification executing means 94 may modify the shift point by using the value of the aft-modified engine rotation speed NEn, calculated with the aft-modified engine rotation speed calculating means 92, intact. In this case, no AT oil temperature reflecting means 97 (SA6) is required.

With the present embodiment described above, moreover, the modification-execution interrupting means 98 (SA2) is arranged not to modify the shift point when the shift point matches the shift-point modification interrupting condition. However, such means is not indispensable to the shift point real-time modifying means 60 and it may possible to take a structure that lacks the provision of such means.

With the present embodiment described above, further, the rotation acceleration A of the engine 12 is used as the engine-rotation acceleration related value. However, the present invention is to limited to such a feature and it may be possible to use rotation acceleration dNT/dt of, for instance, the turbine wheel 14*t* of the torque converter 14. In another alternative, output-shaft rotation acceleration dNout/dt of the automatic transmission 16 may be used. In a further alternative, rotation acceleration of a propeller shaft (not shown) may be used. In a still further alternative, vehicle acceleration "a" (=dV/dt) may be employed. That is, the engine-rotation acceleration related value may include an indefinite number that can be quantitatively identifiable upon corresponding to engine-rotation acceleration A on one-on-one basis. In an alternative, the engine-rotation acceleration related value may include an engine-rotation acceleration related value that can be calculated based on a measurable value.

Likewise, the rotation speed Nt of, for instance, the turbine wheel 14*t* of the torque converter 14 may be employed in place of the rotation speed NE of the engine 12 used in the embodiment set forth above. Not only the output shaft rotation speed Nout of the automatic transmission 16 but also the rotation speed of the propeller shaft (not shown) or the vehicle speed V may be used. That is, the engine-rotation acceleration related value may suffice to include the indefinite number that can be quantitatively identifiable upon corresponding to engine-rotation acceleration A on one-on-one basis and may include an engine-rotation acceleration related value that can be measured directly with a sensor mounted on the vehicle or calculated based on a measurable value.

Further, the present invention may be applied to a diesel engine having no throttle valve or a diesel engine of an in-cylinder injection type. With such applications, an accelerator-opening opening θacc, a fuel injection amount or an intake air amount may be used in place of the throttle opening θth.

With the present embodiment described above, further, for the modified value limiting means 96 to execute guard processing on the aft-modified engine rotation speed NEn, the upper and lower limit values are used for determining the range which NEn should satisfy. Either one of a sum (NEo+α1) of a preliminarily determined given value α1 and the engine rotation speed NEo, appearing at the shift point subsequent to the learning and calculated with the shift-point correcting means 70 to be read out at SC1, and the target maximum engine rotation speed NEd is employed as a small value (min (NEo+α1, NEd)) of the upper limit value NEnmax. The lower limit value NEnmin employs a value obtained by subtracting the preliminarily determined given value α2 from the engine rotation speed NEo at the shift point subsequent to the learning calculated with the shift-point correcting means 70. Moreover, for the acceleration-correcting coefficient calculating means 90 to execute guard processing to calculate the acceleration correcting coefficient γ, the upper limit and the lower limit for determining the range which γ should satisfy are determined based on a preliminarily given constant. However, the present invention is not limited to such factors and the upper limit and the lower limit may be of those that are dynamically altered.

With the present embodiment described above, furthermore, those of a measured result at the upshift-determining timing or a measured result measured nearly at the same time are employed as the working oil temperature Toil of the automatic transmission 16. However, the present invention is not limited to such measured values and a maximal value, a minimal value or an average value of Toil, present for a given time interval up to, for instance, the upshift-determining timing, may be employed.

The present embodiment has been described above with reference to the upshifting that is initiated from the 1st-speed to 2nd-speed gear position is exemplified. However, the learning may be initiated for each shifting among entire neighboring gear positions for the respective gear positions provided by the automatic transmission 16 to enable the shift point to be corrected. In an alternative, only a shifting between specified gear positions may be learned to correct the shift point.

With the present embodiment described above, besides, the acceleration filtering means 144 employs the high-speed Fourier transformation as a filtering process. However, the present invention is not limited to such processing method and those such as, for instance, a low pass filter or the like, which can remove specified frequency components, may be employed. In another alternative, a so-called annealing treatment, given by a formula expressed below, may be executed to allow converted vehicle acceleration "as" to be used.

$$as(t)=as(t-\Delta t)+(a(t)-as(t-\Delta t))/K$$

where Δt represents an iteration time for which, for instance, the current formula is iteratively executed and which falls in a minimal time set in the order of, for instance, several milliseconds or several tens milliseconds. Further, K is referred to as a so-called annealing coefficient and represents a number to determine the degree of annealing.

With the present embodiment described above, further, the second fluctuation detecting means 148 allows the fluctuation determining counter C to proceed such that the operations are iteratively executed for the predetermined given time interval (at SI9 in FIG. 15). However, the present invention is not limited to such operations and the operations may be iteratively executed, for instance, a given number of times. In an alternative, iterative operations may be continued unless the shifting occurs, i.e., unless the vehicle continuously runs at the same gear position. In contrast, only a value of the fluctuation determining counter C may be employed after the fluctuation determining counter C has iteratively executed the operations for a given time interval.

With the present embodiment described above, furthermore, the learning gain adjusting means 142 is arranged to use the coefficient α that is preliminarily defined to determine the degree of a reduction in gain K. However, the present invention is not limited to such coefficient and the coefficient α may be determined depending on the degree of a variation in vehicle acceleration "a". Moreover, the gain K is adjusted by the relationship expressed as K'=K×α by multiplying the gain K by the coefficient α. However, the present invention is not limited to such adjustment and the adjustment of the gain K may be achieved by making calculation as K'=K/Δa in accordance with the magnitudes of the fluctuating level, i.e., the deviation Δa of vehicle acceleration "a".

With the present embodiment described above, moreover, the guard value adjusting means 142 is arranged to use the coefficients β1 and β2 that are preliminarily defined to determine the degree of tightening of the guard value. However, the present invention is not limited to such coefficients and the degree of tightening of the guard value may be determined depending on the degree of a variation in vehicle acceleration "a". In addition, the guard value is adjusted in the manner expressed as ΔGmax'=ΔGmax×β1 and ΔGmin'=ΔGmin×β2 by multiplying ΔGmax and ΔGmin by the coefficients β1 and β2, respectively. However, the present invention is not limited to such adjustment and the guard value may be adjusted such that either one of, for instance, ΔGmax and ΔGmin is adjusted with the other one kept intact. In an alternative, a calculation may be performed in formulae expressed as ΔGmax'=ΔGmax/Δa and ΔGmin'=ΔGmin/Δa in accordance with the magnitudes of the fluctuating level, i.e., the deviation Δa of vehicle acceleration "a".

With the present embodiment described above, besides, the first to fifth given values and the first to fifth specified values include those which are preliminarily obtained on experimental tests or determined on simulation. However, the present invention is not limited to such adjustment and, for instance, the first, second and fifth given values may include values prepared on a table or a map based on at least one of the gear positions, the vehicle speed, the throttle opening and the AT oil temperature to be suitably read out from the table or the map.

With the present embodiment described above, further, the vehicle-acceleration fluctuation detecting means 102 is arranged to determine the existence or nonexistence of the fluctuation in vehicle acceleration depending on the first fluctuation determining flag to third fluctuation determining flag. However, the present invention is not limited to such adjustment and the existence or nonexistence of the fluctuation in vehicle acceleration may be determined depending on whether, for instance, a value of the deviation $\Delta a$ (=a−as) in vehicle acceleration satisfies the relationship defined in a formula expressed below in terms of the deviation $\Delta NE2$ (=NEd−NEo) between the constant E, the reference engine-rotation acceleration A2 and the target maximum engine rotation speed NEd and the aft-corrected engine rotation speed NEo.

$$\Delta a = \rho \times (E \times A2)/\Delta NE2$$

Here, the constant E represents an acceleration correction error, i.e., an error allowable limit value of the corrected value on the shifting and is determined in consideration of, for instance, a value of a hysteresis provided between the upshifting line and the downshifting line on the shifting diagram and a value of a difference between the target maximum engine rotation speed and the fuel-cutoff engine rotation speed, etc. In addition, $\rho$ represents a constant number used for conversion between vehicle acceleration and the engine rotation speed and is determined based on a diameter of each drive wheel.

Further, the vehicle-acceleration fluctuation detecting means 102 is arranged to detect the fluctuation in vehicle acceleration. However, the present invention is not limited to such operation and it may suffice to use a value placed in one-to-one relationship in terms of, for instance, engine-rotation acceleration and rotation acceleration of the turbine 14t of the torque converter or the like or the relationship based on such factors.

With the present embodiment described above, furthermore, the shift-point correcting means 70 is used in combination with the shift point real-time modifying means 60 and the shift control means 50. However, the present invention is not limited to such operation and the shift-point correcting means 70 may be used by itself for learning the corrected value for the shift point to be corrected. That is, even if the shift-point correcting means 70 is used by itself, a certain effect results.

The invention claimed is:

1. A control device for a vehicular automatic transmission of the type operative to initiate an upshifting output to allow a vehicle speed to pass across a predetermined shift point during a power on running, and to correct the shift point such that an estimated maximum engine rotation speed which is a maximum value of an engine rotation speed, increasing for a given time interval even after the upshifting output, approaches a target maximum engine rotation speed,
the control device (i) correcting the shift point such that an estimated maximum engine rotation numbers calculated based on an engine rotation acceleration related value at a shifting output timing approaches to a target maximum engine rotation numbers, and (ii) comprising a shift point real-time modifying unit that operates such that, upon a high fluctuation in the engine-rotation acceleration related value itself a correction of the shift point is lower than that of the shift point upon a low fluctuation in the engine-rotation acceleration related value.

2. The control device for the vehicular automatic transmission according to claim 1, wherein the control device, upon a large engine rotation acceleration related value, modifies the shifting point at a lower vehicle speed than upon a small engine rotation acceleration related value, and inhibits modification of the shifting point when a predetermined time period is not passed from a downshifting, or the fluctuation amount of an output shaft rotation numbers of an automatic transmission is larger than a reference predetermined in advance.

3. The control device for the vehicular automatic transmission according to claim 1, wherein the control device compares the fluctuation in the engine-rotation acceleration related value itself with a first predetermined value and a fifth predetermined value, and determines that, when the fluctuation of in the engine-rotation acceleration related value itself is larger than the first predetermined value, the fluctuation occurs in the smaller rotation numbers than when the fluctuation itself is larger than the fifth predetermined value which is smaller than the first predetermined value.

4. A control device for a vehicular automatic transmission of the type operative to initiate an upshifting output to allow a vehicle speed to pass across a predetermined shift point during a power on running, and to correct the shift point such that a maximum value of an engine rotation speed, increasing for a given time interval even after the upshifting output, approaches a target maximum engine rotation speed,
the control device comprising a shift point real-time modifying unit that modifies the shift point, subjected to the correction, on a real time basis based on a value of a ratio between an actual engine-rotation acceleration related value at an upshift-determining timing during the power on running and a reference engine-rotation acceleration related value substituting a value of the actual engine-rotation acceleration related value to a value for a reference running state having no impact on an acceleration of a vehicle, and the target maximum engine rotation speed.

5. The control device for the vehicular automatic transmission according to claim 4, wherein the reference running state includes a flat-road running state with a predetermined reference number-of-occupant state of a vehicle.

6. The control device for the vehicular automatic transmission according to claim 4, wherein the power on running includes a maximum-acceleration running with an accelerator pedal being operated in a maximal demanded state for an engine.

7. The control device for the vehicular automatic transmission according to claim 4, wherein the control device further includes a shift-point correcting unit that estimates an estimated maximum engine rotation speed substituting a maximum value of an engine rotation speed subsequent to the upshifting output during the power on running to the value for the reference running state, and that corrects the shift point based on a corrected value calculated based on a deviation between the estimated maximum engine rotation speed and the target maximum engine rotation speed, and the shift point real-time modifying unit corrects the corrected value on a real time basis.

8. The control device for the vehicular automatic transmission according to claim 7, wherein the control device further includes a vehicle-acceleration fluctuation detecting unit that detects a magnitude of a fluctuation in acceleration of the vehicle, and the shift-point correcting unit adjusts the corrected value based on the magnitude of the fluctuation in acceleration of the vehicle detected with the vehicle-acceleration fluctuation detecting unit.

9. The control device for the vehicular automatic transmission according to claim 8, wherein the shift-point correcting unit adjusts the corrected value such that the greater the magnitude of the fluctuation in acceleration of the vehicle detected with the vehicle-acceleration fluctuation detecting unit, the smaller will be the corrected value in comparison to that upon no fluctuation in acceleration of the vehicle.

10. The control device for the vehicular automatic transmission according to claim 4, wherein the shift point real-time modifying unit includes an aft-modified engine rotation speed calculating unit that calculates an aft-modified engine rotation speed representing an engine rotation speed at a shift point subsequent to the correction based on (i) an acceleration correcting coefficient representing a ratio between the actual engine-rotation acceleration related value at the upshift-determining timing and the reference engine-rotation acceleration related value, and (ii) a deviation between the target maximum engine rotation speed and an aft-corrected engine rotation speed representing an engine rotation speed at the shift point corrected based on the corrected value, or a fore-correction engine rotation speed representing an engine rotation speed at the shift point prior to the correction thereof, by referring to a preliminarily stored relationship.

11. The control device for the vehicular automatic transmission according to claim 10, wherein the relationship preliminarily stored in the aft-modified engine rotation speed calculating unit includes a formula based on which multiplying a value of the acceleration correcting coefficient by a deviation between the target maximum engine rotation speed and the aft-corrected engine rotation speed or the fore-correction engine rotation speed to allow a product on multiplication to be subtracted from the target maximum engine rotation speed for thereby calculating the aft-modified engine rotation speed.

12. The control device for the vehicular automatic transmission according to claim 10, wherein the relationship preliminarily stored in the aft-modified engine rotation speed calculating unit includes a table enabling a calculation of the aft-modified engine rotation speed based on a value of the acceleration correcting coefficient, and a deviation between the target maximum engine rotation speed and the aft-corrected engine rotation speed or the fore-correction engine rotation speed.

13. The control device for the vehicular automatic transmission according to claim 10, wherein the aft-modified engine rotation speed calculating unit includes a modified value limiting unit that limits the aft-modified engine rotation speed calculated with the aft-modified engine rotation speed calculating unit to a value between an upper limit value and a lower limit value that are determined.

14. The control device for the vehicular automatic transmission according to claim 10, wherein the aft-modified engine rotation speed calculating unit determines the aft-modified engine rotation speed based on a working oil temperature of the automatic transmission.

15. The control device for the vehicular automatic transmission according to claim 4, wherein the shift point real-time modifying unit is inoperative to modify the shift point when the shift point matches a predetermined shift-point modification interrupting condition.

16. The control device for the vehicular automatic transmission according to claim 1, wherein the control device, when the fluctuation of the engine rotation acceleration related value is large, continues the learning with setting the correction of the shifting point smaller, than when the fluctuation of the engine rotation acceleration related value is small.

* * * * *

UNITED STATES PATENT AND TRADEMARK OFFICE
CERTIFICATE OF CORRECTION

| | |
|---|---|
| PATENT NO. | : 8,265,840 B2 |
| APPLICATION NO. | : 12/444416 |
| DATED | : September 11, 2012 |
| INVENTOR(S) | : Masato Watanabe et al. |

It is certified that error appears in the above-identified patent and that said Letters Patent is hereby corrected as shown below:

In the Specifications

At column 1, line number 38, the word "filly" should be "fully".

At column 17, line number 45, the letters "AM" should be "A2".

At column 19, line number 19, the letters "SAS" should be "SA5".

At column 28, line number 42, the formula "$G(N) = G(N-1) \div \Delta G'''$" should be "$G(N) = G(N-1) + \Delta G'''$".

Signed and Sealed this
Sixth Day of May, 2014

Michelle K. Lee
*Deputy Director of the United States Patent and Trademark Office*